(12) United States Patent
Park et al.

(10) Patent No.: US 11,706,744 B2
(45) Date of Patent: Jul. 18, 2023

(54) BANDWIDTH PART CONFIGURATION SWITCHING FOR MULTIPLE TRANSCEIVER NODES

(71) Applicant: QUALCOMM Incorporated, San Diego, CA (US)

(72) Inventors: Sungwoo Park, San Diego, CA (US); Mostafa Khoshnevisan, San Diego, CA (US); Xiaoxia Zhang, San Diego, CA (US); Tao Luo, San Diego, CA (US); Jing Sun, San Diego, CA (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 300 days.

(21) Appl. No.: 16/708,265

(22) Filed: Dec. 9, 2019

(65) Prior Publication Data

US 2020/0288474 A1 Sep. 10, 2020

Related U.S. Application Data

(60) Provisional application No. 62/814,063, filed on Mar. 5, 2019.

(51) Int. Cl.
*H04W 36/06* (2009.01)
*H04W 72/0453* (2023.01)
(Continued)

(52) U.S. Cl.
CPC ....... *H04W 72/0453* (2013.01); *H04W 36/06* (2013.01); *H04W 72/23* (2023.01);
(Continued)

(58) Field of Classification Search
CPC ........... H04W 72/0453; H04W 72/042; H04W 36/06; H04W 72/23; H04L 5/0035; H04L 5/0098; H04L 5/001; H04B 7/024
See application file for complete search history.

(56) References Cited

U.S. PATENT DOCUMENTS

2015/0063251 A1 3/2015 Asterjadhi
2018/0183551 A1 6/2018 Chou et al.
(Continued)

OTHER PUBLICATIONS

Anonymous: "ShareTechnote—LTE Quick Reference—DRX (Discontinuous Reception)—CDRX (Connected Mode DRX)", Nov. 29, 2018 (Nov. 29, 2018), XP055673531, pp. 40-50, Retrieved from the Internet: URL: https://web.archive.org/web/20181129202238/https://www.sharetechnote.com/html/Handbook_LTE_DRX.html [retrieved-on Mar. 4, 2020], the whole document.
(Continued)

*Primary Examiner* — Omar J Ghowrwal
(74) *Attorney, Agent, or Firm* — Qualcomm Incorporated

(57) ABSTRACT

Methods, systems, and devices for wireless communications are described. A first transceiver node of a set of transceiver nodes may transmit a control message (e.g., downlink control information (DCI)) to a user equipment (UE). Upon receiving the control message, the UE may switch from a first bandwidth part (BWP) configuration for the first transceiver node to a second BWP configuration for the first transceiver node. Additionally, the UE may switch from BWP configurations for other transceiver nodes of the set of transceiver nodes. Upon switching from the first BWP configuration, the UE may start a timer and may switch from the second BWP configuration to a third BWP configuration upon expiration of the timer. The timer may be restarted each time the UE receives a communication from any of the set of transceiver nodes, a subset of the set of transceiver nodes, or from the first transceiver node.

30 Claims, 24 Drawing Sheets

(51) Int. Cl.
*H04W 72/23* (2023.01)
*H04L 5/00* (2006.01)
*H04B 7/024* (2017.01)

(52) U.S. Cl.
CPC .............. *H04B 7/024* (2013.01); *H04L 5/001* (2013.01); *H04L 5/0035* (2013.01); *H04L 5/0098* (2013.01)

(56) References Cited

U.S. PATENT DOCUMENTS

| | | | |
|---|---|---|---|
| 2018/0367386 A1 | 12/2018 | Liao | |
| 2019/0045491 A1 | 2/2019 | Zhang et al. | |
| 2019/0045571 A1* | 2/2019 | Wu | H04W 76/18 |
| 2019/0215900 A1* | 7/2019 | Pan | H04W 76/38 |
| 2019/0297579 A1 | 9/2019 | Bhattad et al. | |
| 2020/0052782 A1* | 2/2020 | Wang | H04W 76/27 |

OTHER PUBLICATIONS

Ericsson: "On the Use of a Preamble for NR-U", 3GPP Draft, 3GPP TSG-RAN WG1 Meeting #95, R1-1814021 On the Use of a Preamble for NR-U REV_UPDATEDTABLES, 3rd Generation Partnership Project (3GPP), Mobile Competence Centre, 650, Route Des Lucioles , F-06921 Sophia-Antipolis CED, vol. RAN WG1, No. Spokane, USA, Nov. 12, 2018-Nov. 16, 2018, Nov. 15, 2018 (Nov. 15, 2018), XP051494465, pp. 1-15, Retrieved from the Internet: URL: http://www.3gpp.org/ftp/tsg%5Fran/WG1%5FRL1/TSGR1%5F95/Docs/R1%2D1814021%2Ezip [retrieved on Nov. 15, 2018], Section 3, Section 3.1, pp. 5-6.

Hiertz G.R., et al., "The Evolution of Wireless LANs and PANs—Analysis of IEEE 802.11 E for qos Support in Wireless LANs," IEEE Personal Communications, IEEE Communications Society, US, vol. 10 (6), Dec. 1, 2003, pp. 40-50, XP011107079, ISSN: 1070-9916, DOI: 10.1109/MWC.2003.1265851.

International Search Report and Written Opinion—PCT/US2019/067393—Isa/Epo—dated Mar. 11, 2020.

International Search Report and Written Opinion—PCT/US2020/013350—ISA/EPO—dated Mar. 25, 2020.

Samsung: "RRC-Triggered BWP Activation", 3GPP Draft, R2-1805844, RRC-Triggered BWP Activation, 3rd Generation Partnership Project (3GPP), Mobile Competence Centre, 650, Route Des Lucioles, F-06921 Sophia-Antipolis Cedex, France, vol. RAN WG2, No. Sanya, China, Apr. 16, 2018-Apr. 20, 2018, Apr. 14, 2018 (Apr. 14, 2018), XP051429460, 4 pages, Retrieved from the Internet: URL: http://www.3gpp.org/ftp/Meetings%5F3GPP%5FSYNC/RAN2/Docs/. [retrieved on Apr. 14, 2018], the whole document.

* cited by examiner

BANDWIDTH PART CONFIGURATION SWITCHING FOR MULTIPLE TRANSCEIVER NODES

CROSS REFERENCE

The present application for patent claims the benefit of U.S. Provisional Patent Application No. 62/814,063 by PARK et al., entitled "BANDWIDTH PART CONFIGURATION SWITCHING FOR MULTIPLE TRANSCEIVER NODES," filed Mar. 5, 2019, assigned to the assignee hereof, and expressly incorporated herein.

BACKGROUND

The following relates generally to wireless communications, and more specifically to bandwidth part (BWP) configuration switching for multiple transceiver nodes.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some cases, a UE may communicate with a transceiver node using a bandwidth part (BWP). The transceiver node may communicate control messaging to the UE to indicate a BWP switch for an upcoming communication. However, such techniques may be limited to scenarios involving a single transceiver node.

SUMMARY

The described techniques relate to improved methods, systems, devices, and apparatuses that support bandwidth part (BWP) configuration switching for multiple transceiver nodes. Generally, the described techniques provide for a user equipment (UE) to switch BWP configurations when communicating with a set of transceiver nodes (e.g., multiple transmission reception points (TRPs)) configured as a transceiver node cluster. For example, the UE may receive a control message (e.g., downlink control information (DCI)) from a transceiver node of the set of transceiver nodes and may switch BWP configurations for one or more of the set of transceiver nodes.

A UE may identify a transceiver node cluster including a set of transceiver nodes configured for communication with the UE. A first transceiver node of the set of transceiver nodes may transmit a control message (e.g., DCI) to the UE. Upon receiving the control message, the UE may switch from a first BWP configuration for the first transceiver node to a second BWP configuration for the first transceiver node. Additionally, the UE may switch BWP configurations for other transceiver nodes of the set of transceiver nodes based on the received control information for the first transceiver node. In this way, the UE and the transceiver nodes may be able to coordinate BWP configuration switching for multiple transceiver nodes using a control message sent from a single transceiver node. In some examples, the UE may maintain separate BWP configurations for the separate transceiver nodes, and may receive separate control messages to independently switch the BWP configurations for the separate transceiver nodes. In such examples, the transceiver nodes may coordinate (e.g., using backhaul signaling) regarding the independent BWP switching occurrences for the separate transceiver nodes and the associated switching control messages.

In some cases, upon switching from the first BWP configuration to the second BWP configuration, the UE may start a timer and may switch from the second BWP configuration to a third BWP configuration (e.g., a default BWP configuration) upon expiration of the timer. In one example, the UE may start a common timer for all transceiver nodes of the set of transceiver nodes and may restart the common timer each time the UE receives a control message (e.g., a DCI) from any of the set of transceiver nodes. The UE may switch to the third BWP configuration when the UE has not received additional control messages before the common timer expires. In another example, the UE may start a timer common to a subset of the set of transceiver nodes and may restart the timer each time the UE receives a control message (e.g., a DCI) from the subset of the set of transceiver nodes. For instance, the subset of the set of transceiver nodes may be the transceiver nodes that are indicated as master transceiver nodes. The UE may switch to the third BWP configuration when the UE has not received additional control messages from the master transceiver nodes before the timer expires. In another example, the UE may start separate timers for each transceiver node of the set of transceiver nodes and, upon receiving a control message, may restart a timer corresponding to the transceiver node that sent the control message. The UE may switch to the third BWP configuration when any one of the separate timers expires.

A method of wireless communications at a UE is described. The method may include identifying a transceiver node cluster including a set of transceiver nodes configured for communication with the UE, receiving a control message from a first transceiver node of the set of transceiver nodes, and switching from a first bandwidth part configuration for the first transceiver node to a second bandwidth part configuration for the first transceiver node based on the control message.

An apparatus for wireless communications at a UE is described. The apparatus may include a processor, memory in electronic communication with the processor, and instructions stored in the memory. The instructions may be executable by the processor to cause the apparatus to identify a transceiver node cluster including a set of transceiver nodes configured for communication with the UE, receive a control message from a first transceiver node of the set of transceiver nodes, and switch from a first bandwidth part configuration for the first transceiver node to a second bandwidth part configuration for the first transceiver node based on the control message.

Another apparatus for wireless communications at a UE is described. The apparatus may include means for identifying a transceiver node cluster including a set of transceiver nodes configured for communication with the UE, receiving a control message from a first transceiver node of the set of transceiver nodes, and switching from a first bandwidth part configuration for the first transceiver node to a second bandwidth part configuration for the first transceiver node based on the control message.

A non-transitory computer-readable medium storing code for wireless communications at a UE is described. The code may include instructions executable by a processor to identify a transceiver node cluster including a set of transceiver nodes configured for communication with the UE, receive a control message from a first transceiver node of the set of transceiver nodes, and switch from a first bandwidth part configuration for the first transceiver node to a second bandwidth part configuration for the first transceiver node based on the control message.

Some examples of the method, apparatuses, and non-transitory computer-readable medium described herein may further include operations, features, means, or instructions for switching from a first bandwidth part configuration for a second transceiver node of the set of transceiver nodes to a second bandwidth part configuration for the second transceiver node based on the control message.

In some examples of the method, apparatuses, and non-transitory computer-readable medium described herein, the first bandwidth part configuration for the first transceiver node spans a same radio frequency bandwidth as the first bandwidth part configuration for the second transceiver node, and where the second bandwidth part configuration for the first transceiver node spans a same radio frequency bandwidth as the second bandwidth part configuration for the second transceiver node.

Some examples of the method, apparatuses, and non-transitory computer-readable medium described herein may further include operations, features, means, or instructions for receiving a configuration message that identifies at least the first transceiver node as a master transceiver node.

In some examples of the method, apparatuses, and non-transitory computer-readable medium described herein, the switching from the first bandwidth part configuration for the second transceiver node to the second bandwidth part configuration for the second transceiver node may be further based on the first transceiver node being identified as the master transceiver node.

Some examples of the method, apparatuses, and non-transitory computer-readable medium described herein may further include operations, features, means, or instructions for starting a common timer for the set of transceiver nodes based on switching from the first bandwidth part configuration for the first transceiver node to the second bandwidth part configuration for the first transceiver node.

Some examples of the method, apparatuses, and non-transitory computer-readable medium described herein may further include operations, features, means, or instructions for receiving a communication from any of the set of transceiver nodes, and restarting the common timer for the set of transceiver nodes based on receiving the communication from any of the set of transceiver nodes.

Some examples of the method, apparatuses, and non-transitory computer-readable medium described herein may further include operations, features, means, or instructions for switching from the second bandwidth part configuration for the first transceiver node to a third bandwidth part configuration for the first transceiver node upon expiration of the common timer for the set of transceiver nodes, and switching from a first bandwidth part configuration for a second transceiver node of the set of transceiver nodes to a second bandwidth part configuration for the second transceiver node upon expiration of the common timer for the set of transceiver nodes.

In some examples of the method, apparatuses, and non-transitory computer-readable medium described herein, the third bandwidth part configuration for the first transceiver node and the second bandwidth part configuration for the second transceiver node include default bandwidth part configurations.

Some examples of the method, apparatuses, and non-transitory computer-readable medium described herein may further include operations, features, means, or instructions for receiving a configuration message that identifies a subset of the set of transceiver nodes as master transceiver nodes, and starting a common timer for the subset of the set of transceiver nodes based on switching from the first bandwidth part configuration for the first transceiver node to the second bandwidth part configuration for the first transceiver node.

Some examples of the method, apparatuses, and non-transitory computer-readable medium described herein may further include operations, features, means, or instructions for receiving a communication from a transceiver node of the subset of the set of transceiver nodes, and restarting the common timer for the subset of the set of transceiver nodes based on receiving the communication from the transceiver node of the subset of the set of transceiver nodes.

Some examples of the method, apparatuses, and non-transitory computer-readable medium described herein may further include operations, features, means, or instructions for switching from the second bandwidth part configuration for the first transceiver node to a third bandwidth part configuration for the first transceiver node upon expiration of the common timer for the subset of the set of transceiver nodes, and switching from a first bandwidth part configuration for a transceiver node of the subset of the set of transceiver nodes to a second bandwidth part configuration for the transceiver node of the subset of the set of transceiver nodes upon expiration of the common timer for the subset of the set of transceiver nodes.

In some examples of the method, apparatuses, and non-transitory computer-readable medium described herein, the third bandwidth part configuration for the first transceiver node and the second bandwidth part configuration for the transceiver node of the subset of the set of transceiver nodes include default bandwidth part configurations.

Some examples of the method, apparatuses, and non-transitory computer-readable medium described herein may further include operations, features, means, or instructions for receiving a communication from a transceiver node of the set of transceiver nodes that may be outside the subset of the set of transceiver nodes, and maintaining the common timer for the subset of the set of transceiver nodes after receiving the communication from the transceiver node that may be outside the subset of the set of transceiver nodes.

Some examples of the method, apparatuses, and non-transitory computer-readable medium described herein may further include operations, features, means, or instructions for starting a set of separate timers for each of the set of transceiver nodes based on switching from the first bandwidth part configuration for the first transceiver node to the second bandwidth part configuration for the first transceiver node.

Some examples of the method, apparatuses, and non-transitory computer-readable medium described herein may further include operations, features, means, or instructions for receiving a communication from the first transceiver node, and restarting a separate timer at the first transceiver node based on receiving the communication from the first transceiver node.

Some examples of the method, apparatuses, and non-transitory computer-readable medium described herein may further include operations, features, means, or instructions for switching from the second bandwidth part configuration for the first transceiver node to a third bandwidth part configuration for the first transceiver node upon expiration of a first expiring timer of the set of separate timers, and switching from a first bandwidth part configuration for a second transceiver node of the set of transceiver nodes to a second bandwidth part configuration for the second transceiver node upon expiration of the first expiring timer of the set of separate timers.

In some examples of the method, apparatuses, and non-transitory computer-readable medium described herein, the third bandwidth part configuration for the first transceiver node and the second bandwidth part configuration for the second transceiver node include default bandwidth part configurations.

Some examples of the method, apparatuses, and non-transitory computer-readable medium described herein may further include operations, features, means, or instructions for maintaining a first bandwidth part configuration for a second transceiver node of the set of transceiver nodes after switching from the first bandwidth part configuration for the first transceiver node to the second bandwidth part configuration for the first transceiver node.

Some examples of the method, apparatuses, and non-transitory computer-readable medium described herein may further include operations, features, means, or instructions for starting a first timer for the first transceiver node based on switching from the first bandwidth part configuration for the first transceiver node to the second bandwidth part configuration for the first transceiver node.

Some examples of the method, apparatuses, and non-transitory computer-readable medium described herein may further include operations, features, means, or instructions for receiving a second control message from the second transceiver node, switching from the first bandwidth part configuration for the second transceiver node to a second bandwidth part configuration for the second transceiver node, starting a second timer for the second transceiver node based on switching from the first bandwidth part configuration for the second transceiver node to the second bandwidth part configuration for the second transceiver node, and maintaining the first timer after switching from the first bandwidth part configuration for the second transceiver node to the second bandwidth part configuration for the second transceiver node.

In some examples of the method, apparatuses, and non-transitory computer-readable medium described herein, the first bandwidth part configuration for the first transceiver node and a first bandwidth part configuration for a second transceiver node of the set of transceiver nodes share a same center frequency.

Some examples of the method, apparatuses, and non-transitory computer-readable medium described herein may further include operations, features, means, or instructions for identifying a switching gap associated with switching from the first bandwidth part configuration for the first transceiver node to the second bandwidth part configuration for the first transceiver node, and refraining from communicating with each transceiver node of the set of transceiver nodes during the switching gap.

In some examples of the method, apparatuses, and non-transitory computer-readable medium described herein, the control message includes a DCI message.

A method of wireless communications is described. The method may include identifying a transceiver node cluster including a set of transceiver nodes configured for communication with a UE, transmitting, from a first transceiver node of the set of transceiver nodes, a control message, and switching from a first bandwidth part configuration for the first transceiver node to a second bandwidth part configuration for the first transceiver node after transmitting the control message.

An apparatus for wireless communications is described. The apparatus may include a processor, memory in electronic communication with the processor, and instructions stored in the memory. The instructions may be executable by the processor to cause the apparatus to identify a transceiver node cluster including a set of transceiver nodes configured for communication with a UE, transmit, from a first transceiver node of the set of transceiver nodes, a control message, and switch from a first bandwidth part configuration for the first transceiver node to a second bandwidth part configuration for the first transceiver node after transmitting the control message.

Another apparatus for wireless communications is described. The apparatus may include means for identifying a transceiver node cluster including a set of transceiver nodes configured for communication with a UE, transmitting, from a first transceiver node of the set of transceiver nodes, a control message, and switching from a first bandwidth part configuration for the first transceiver node to a second bandwidth part configuration for the first transceiver node after transmitting the control message.

A non-transitory computer-readable medium storing code for wireless communications is described. The code may include instructions executable by a processor to identify a transceiver node cluster including a set of transceiver nodes configured for communication with a UE, transmit, from a first transceiver node of the set of transceiver nodes, a control message, and switch from a first bandwidth part configuration for the first transceiver node to a second bandwidth part configuration for the first transceiver node after transmitting the control message.

In some examples of the method, apparatuses, and non-transitory computer-readable medium described herein, switching from the first bandwidth part configuration for the first transceiver node to the second bandwidth part configuration for the first transceiver node may include operations, features, means, or instructions for switching from a first set of bandwidth part configurations for each transceiver node of the set of transceiver nodes to a second set of bandwidth part configurations for each transceiver node of the set of transceiver nodes after transmitting the control message.

In some examples of the method, apparatuses, and non-transitory computer-readable medium described herein, each of the first set of bandwidth part configurations for each transceiver node of the set of transceiver nodes spans a same radio frequency bandwidth and where each of the second set of bandwidth part configurations for each transceiver node of the set of transceiver nodes spans a same frequency radio frequency bandwidth.

Some examples of the method, apparatuses, and non-transitory computer-readable medium described herein may further include operations, features, means, or instructions for transmitting a configuration message that identifies at least the first transceiver node as a master transceiver node, where switching from the first set of bandwidth part configurations for each transceiver node of the set of transceiver nodes to the second set of bandwidth part configurations for each transceiver node of the set of transceiver nodes may be based on the first transceiver node being the master transceiver node.

Some examples of the method, apparatuses, and non-transitory computer-readable medium described herein may further include operations, features, means, or instructions for determining an expiration time of a common timer for the set of transceiver nodes based on switching from the first bandwidth part configuration for the first transceiver node to the second bandwidth part configuration for the first transceiver node.

Some examples of the method, apparatuses, and non-transitory computer-readable medium described herein may further include operations, features, means, or instructions for transmitting a communication from any of the set of transceiver nodes, and updating the expiration time based on transmitting the communication from any of the set of transceiver nodes.

Some examples of the method, apparatuses, and non-transitory computer-readable medium described herein may further include operations, features, means, or instructions for switching from the second bandwidth part configuration for the first transceiver node to a third bandwidth part configuration for the first transceiver node upon reaching the determined expiration time, and switching from a first bandwidth part configuration for a second transceiver node of the set of transceiver nodes to a second bandwidth part configuration for the second transceiver node upon reaching the determined expiration time.

In some examples of the method, apparatuses, and non-transitory computer-readable medium described herein, the third bandwidth part configuration for the first transceiver node and the second bandwidth part configuration for the second transceiver node include default bandwidth part configurations.

Some examples of the method, apparatuses, and non-transitory computer-readable medium described herein may further include operations, features, means, or instructions for transmitting a configuration message that identifies a subset of the set of transceiver nodes as master transceiver nodes, and determining an expiration time for a common timer for the subset of the set of transceiver nodes based on switching from the first bandwidth part configuration for the first transceiver node to the second bandwidth part configuration for the first transceiver node.

Some examples of the method, apparatuses, and non-transitory computer-readable medium described herein may further include operations, features, means, or instructions for transmitting a communication from a transceiver node of the subset of the set of transceiver nodes, and updating the expiration time based on transmitting the communication from the transceiver node of the subset of the set of transceiver nodes.

Some examples of the method, apparatuses, and non-transitory computer-readable medium described herein may further include operations, features, means, or instructions for switching from the second bandwidth part configuration for the first transceiver node to a third bandwidth part configuration for the first transceiver node upon reaching the determined expiration time, and switching from a first bandwidth part configuration for a transceiver of the subset of the set of transceiver nodes to a second bandwidth part configuration for the transceiver of the subset of the set of transceiver nodes upon reaching the determined expiration time.

In some examples of the method, apparatuses, and non-transitory computer-readable medium described herein, the third bandwidth part configuration for the first transceiver node and the second bandwidth part configuration for transceiver of the subset of the set of transceiver nodes include default bandwidth part configurations.

Some examples of the method, apparatuses, and non-transitory computer-readable medium described herein may further include operations, features, means, or instructions for transmitting a communication from a transceiver node of the set of transceiver nodes that may be outside the subset of the set of transceiver nodes, and refraining from updating the expiration time based on transmitting the communication from the transceiver node of the set of transceiver nodes that may be outside the subset of the set of transceiver nodes.

Some examples of the method, apparatuses, and non-transitory computer-readable medium described herein may further include operations, features, means, or instructions for determining a set of expiration times for each of the set of transceiver nodes based on switching from the first bandwidth part configuration for the first transceiver node to the second bandwidth part configuration for the first transceiver node.

Some examples of the method, apparatuses, and non-transitory computer-readable medium described herein may further include operations, features, means, or instructions for transmitting a communication from a transceiver node of the set of transceiver nodes, and updating an expiration time for the transceiver node of the set of transceiver nodes based on transmitting the communication.

Some examples of the method, apparatuses, and non-transitory computer-readable medium described herein may further include operations, features, means, or instructions for switching from the second bandwidth part configuration for the first transceiver node to a third bandwidth part configuration for the first transceiver node upon reaching a first expiration time of the set of expiration times, and switching from a first bandwidth part configuration for a second transceiver of the set of transceiver nodes to a second bandwidth part configuration for the second transceiver upon reaching the determined expiration time.

In some examples of the method, apparatuses, and non-transitory computer-readable medium described herein, the third bandwidth part configuration for the first transceiver node and the second bandwidth part configuration for the second transceiver node include default bandwidth part configurations.

Some examples of the method, apparatuses, and non-transitory computer-readable medium described herein may further include operations, features, means, or instructions for maintaining a first bandwidth part configuration for a second transceiver node of the set of transceiver nodes after switching from the first bandwidth part configuration for the first transceiver node to the second bandwidth part configuration for the first transceiver node.

Some examples of the method, apparatuses, and non-transitory computer-readable medium described herein may further include operations, features, means, or instructions for coordinating, among the set of transceiver nodes, a first switching gap for the set of transceiver nodes, where the first switching gap may be associated with switching from the first bandwidth part configuration for the first transceiver node to the second bandwidth part configuration for the first transceiver node.

Some examples of the method, apparatuses, and non-transitory computer-readable medium described herein may further include operations, features, means, or instructions for coordinating, among the set of transceiver nodes, a second switching gap for the set of transceiver nodes, where the second switching gap may be associated with switching from the first bandwidth part configuration for the second transceiver node to a second bandwidth part configuration for the second transceiver node, and where the second switching gap spans a same time duration as the first switching gap.

Some examples of the method, apparatuses, and non-transitory computer-readable medium described herein may further include operations, features, means, or instructions for coordinating, among the set of transceiver nodes, a common center frequency for the second bandwidth part configuration for the first transceiver node and the second bandwidth part configuration for the second transceiver node.

Some examples of the method, apparatuses, and non-transitory computer-readable medium described herein may further include operations, features, means, or instructions for determining a first expiration time at the first transceiver node based on switching from the first bandwidth part configuration for the first transceiver node to the second bandwidth part configuration for the first transceiver node.

Some examples of the method, apparatuses, and non-transitory computer-readable medium described herein may further include operations, features, means, or instructions for transmitting a second control message from the second transceiver node, switching from the first bandwidth part configuration for the second transceiver node to a second bandwidth part configuration for the second transceiver node, determining a second expiration time at the second transceiver node based on switching from the first bandwidth part configuration for the second transceiver node to the second bandwidth part configuration for the second transceiver node, and refraining from updating the first expiration time after switching from the first bandwidth part configuration for the second transceiver node to the second bandwidth part configuration for the second transceiver node.

In some examples of the method, apparatuses, and non-transitory computer-readable medium described herein, the first bandwidth part configuration for the first transceiver node and a first bandwidth part configuration for a second transceiver node of the set of transceiver nodes share a same center frequency.

Some examples of the method, apparatuses, and non-transitory computer-readable medium described herein may further include operations, features, means, or instructions for identifying a switching gap associated with switching from the first bandwidth part configuration for the first transceiver node to the second bandwidth part configuration for the first transceiver node, and refraining from communicating with the UE during the switching gap.

DETAILED DESCRIPTION

Figure 1:
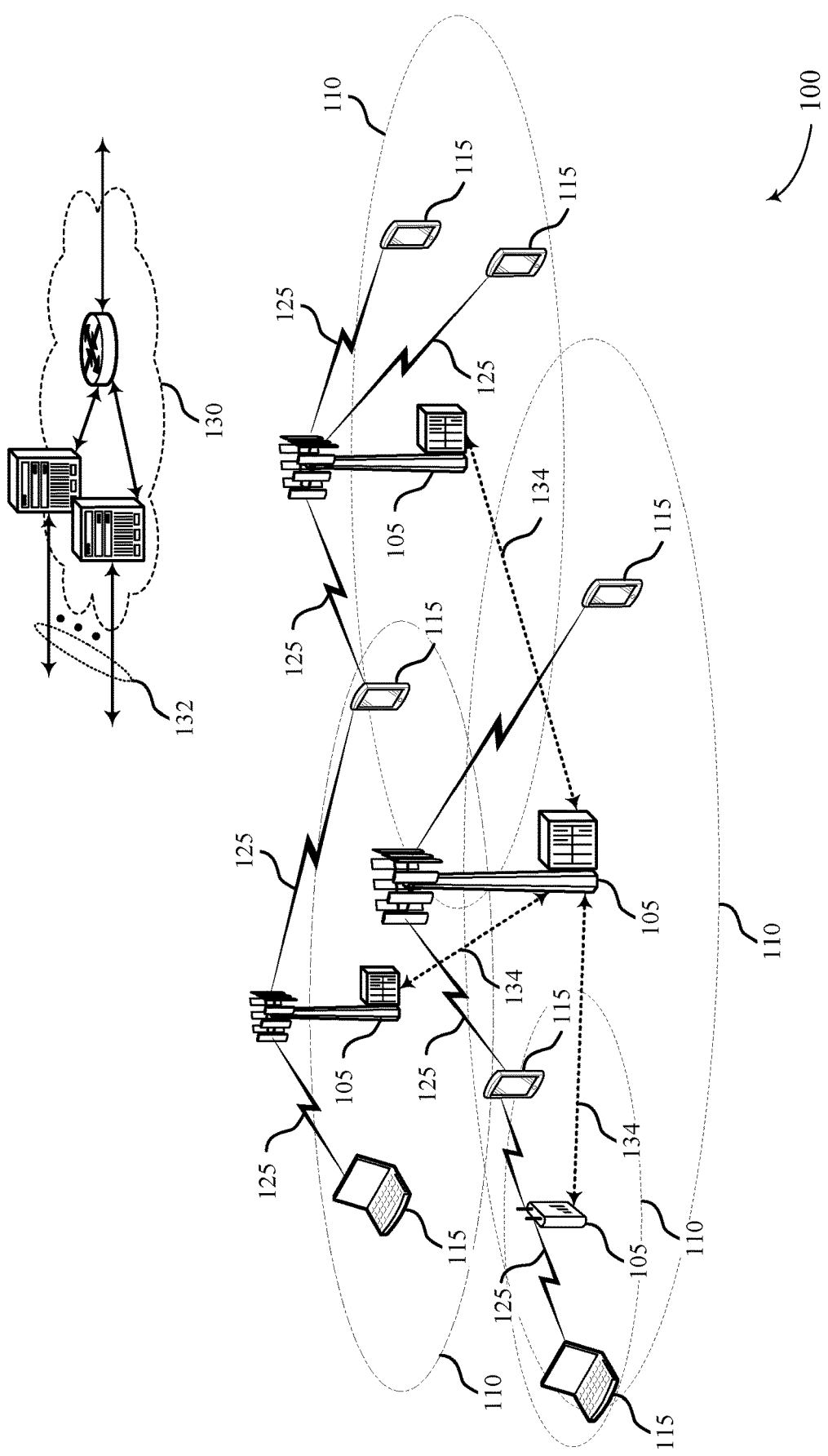
FIG. 1 illustrates an example of a wireless communications system that supports bandwidth part (BWP) configuration switching for multiple transceiver nodes in accordance with aspects of the present disclosure.

A user equipment (UE) may communicate with a transceiver node over a contiguous set of resources, such as one or more bandwidth parts (BWPs). Such communications may include, for instance, the UE receiving downlink control information (DCI) from the transceiver node and using the DCI to determine resources for receiving a physical shared downlink channel (PDSCH) or transmitting a physical shared uplink channel (PUSCH). In some cases, communication may involve the UE switching from a first BWP configuration to a second BWP configuration. For instance, the UE may receive a DCI from a transceiver node on a first downlink BWP indicating that the UE is to switch to a different BWP configuration. Switching to a different BWP configuration may involve changing an initial downlink BWP to a different downlink BWP, changing an initial uplink BWP to a different uplink BWP, or both. In one example, a UE may receive a DCI on a first downlink BWP, may switch to a second downlink BWP indicated by the DCI, and may receive a PDSCH within the second downlink BWP. In another example, a UE may receive a DCI on a first downlink BWP associated with a first uplink BWP, may switch to a second uplink BWP indicated by the DCI, and may transmit a PUSCH within the second uplink BWP.

The above techniques may assume that the UE is communicating with a single transceiver node. However, in some cases, a UE may be communicating with a set of transceiver nodes (e.g., the UE may be communicating with multiple transmission reception points (TRPs) in multi-TRP communication).

To enable coordination between transceiver nodes during BWP configuration switching and/or to enable multiple BWP configurations to be switched concurrently, a UE may identify a transceiver node cluster including the set of transceiver nodes; receive a control message (e.g., a DCI) or downlink communication from a first transceiver node of the set of transceiver nodes; and switch from a first BWP configuration for the first transceiver node to a second BWP configuration for the first transceiver node. The transceiver node may be any of the set of transceiver nodes or may be a master transceiver node. In some cases, upon receiving the control message or downlink communication, the UE may switch BWP configurations for other transceiver nodes of the set of transceiver nodes from initial BWP configurations to updated BWP configurations. In other cases, the UE may determine to maintain the BWP configurations of the other transceiver nodes at their initial BWP configuration and may just switch from the first BWP configuration for the first transceiver node to the second BWP configuration for the first transceiver node. In either case, the set of transceiver nodes and the UE may refrain from performing communications during a switching gap.

In some cases, the UE may use one or more timers to determine when to switch from the second BWP configuration to a third BWP configuration (e.g., a default BWP configuration). In one example, the UE may start a common timer for all transceiver nodes of the set of transceiver nodes and may restart the common timer each time the UE receives a control message (e.g., a DCI) or a downlink communication from any of the set of transceiver nodes. The UE may switch to the third BWP configuration when the UE has not received additional control messages or communications before the common timer expires. In another example, the UE may start a timer common to a subset of the set of transceiver nodes and may restart the timer each time the UE receives a control message (e.g., a DCI) or a downlink communication from the subset of the set of transceiver nodes. For instance, the subset of the set of transceiver nodes may be the transceiver nodes that are indicated as master transceiver nodes. The UE may switch to the third BWP configuration when the UE has not received additional control messages or downlink communications from the master transceiver nodes before the timer expires. In another example, the UE may start separate timers for each transceiver node of the set of transceiver nodes and, upon receiving a control message or downlink communication, may restart a timer corresponding to the transceiver node that sent the control message or downlink communication. The UE may switch to the third BWP configuration when any one of the separate timers expires (e.g., when the earliest timer of the separate timers expires). In some cases, the third BWP configuration may be the same as the first BWP configuration.

Aspects of the disclosure are initially described in the context of a wireless communications system. Additional aspects of the disclosure are further described in the context of an additional wireless communications system, BWP switching schemes, and a process flow. Aspects of the disclosure are further illustrated by and described with reference to apparatus diagrams, system diagrams, and flowcharts that relate to BWP configuration switching for multiple transceiver nodes.

FIG. 1 illustrates an example of a wireless communications system 100 that supports BWP configuration switching for multiple transceiver nodes in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, a UE 115 may communicate with one or more transceiver nodes. Each transceiver node may, for instance, be an individual base station 105 or a TRP. Alternatively, a base station 105 may include one or more transceiver nodes. A set of transceiver nodes may make up a transceiver node cluster.

Communicating with the transceiver nodes may involve switching BWPs. In general, BWP switching for transceiver nodes may be done through dynamic activation (e.g., receiving a DCI that explicitly indicates that a UE 115 is to switch BWP for a transceiver node) or may be timer-based. If the BWP is timer-based, the UE may switch from an active BWP for a transceiver node to a default BWP. In some cases, the default BWP may be an initial active BWP, such as a BWP the UE 115 was using just prior to the active BWP.

How the UE 115 performs timer-based switching may be based on how the UE 115 performs FDD-based or TDD-based BWP switching. If the UE 115 performs FDD-based BWP switching, the UE 115 may start a timer when it switches its active downlink BWP to a downlink BWP other than the default BWP. The UE may restart the timer to the initial value when it successfully decodes a DCI to schedule PDSCH in its active downlink BWP. The UE may switch its active downlink BWP to the default BWP when the timer expires. For TDD-based BWP switching, a UE may start a timer when it switches its activate downlink and uplink BWP pair to another downlink and uplink BWP pair other than the default downlink and uplink BWP pair. The UE may restart the timer to the initial value when it successfully decodes a DCI to schedule PDSCH and/or PUSCH in its active downlink and uplink BWP pair. The UE 115 may switch its active downlink and uplink BWP pair to the default downlink and uplink BWP when the timer expires. The timer may have a granularity of 1 ms (e.g., a subframe) for sub-6 GHz and may have a granularity of 0.5 ms (e.g., half a sub-frame) for above-6 GHz. Additionally, the timer may have a maximum time length (e.g., 50 ms).

In some cases, there may be a radio frequency (RF) switching latency (e.g., a switching gap) associated with switching from a BWP configuration (e.g., either a default or active BWP) to an active BWP configuration. Such a delay may be accounted for by a delay $k_0$ from receiving the DCI (e.g., a delay from receiving a DCI to receiving a PDSCH) or by a delay $k_2$ after receiving the DCI (e.g., a delay from receiving a DCI to transmitting a PUSCH). If the UE receives a PDSCH, the UE may transmit an acknowledgement (ACK) or a non-acknowledgement (NACK) (e.g., in the same BWP if TDD-based or in a separate BWP if FDD-based).

According to various aspects, to support BWP configuration switching for multiple transceiver nodes, a UE 115 may identify a transceiver node cluster including a set of transceiver nodes configured for communication with the UE 115. A first transceiver node of the set of transceiver nodes may transmit a control message (e.g., DCI) or downlink communication to a UE 115. Upon receiving the control message or downlink communication, the UE 115 may switch from a first BWP configuration for the first transceiver node to a second BWP configuration for the first transceiver node. Additionally, the UE 115 may switch from BWP configurations for other transceiver nodes of the set of transceiver nodes. In some cases, upon switching from the first BWP configuration to the second BWP configuration, the UE 115 may start a timer and may switch from the second BWP configuration to a third BWP configuration (e.g., a default BWP configuration) upon expiration of the timer.

In one example, the UE 115 may start a common timer for all transceiver nodes of the set of transceiver nodes and may restart the common timer each time the UE 115 receives a control message (e.g., a DCI) or downlink communication from any of the set of transceiver nodes. The UE 115 may switch to the third BWP configuration when the UE 115 has not received additional control messages or downlink communications before the common timer expires. In another example, the UE 115 may start a timer common to a subset of the set of transceiver nodes and may restart the timer each time the UE 115 receives a control message or downlink communication (e.g., a DCI) from the subset of the set of transceiver nodes. For instance, the subset of the set of transceiver nodes may be the transceiver nodes that are master transceiver nodes. The UE 115 may switch to the third BWP configuration when the UE 115 has not received additional control messages or downlink communications from the master transceiver nodes before the timer expires. In another example, the UE 115 may start separate timers for each transceiver node of the set of transceiver nodes and, upon receiving a control message or downlink communication, may restart a timer corresponding to the transceiver node that sent the control message or downlink communication. The UE 115 may switch to the third BWP configuration when any one of the separate timers expires. If the transceiver nodes are TRPs, the separate timers may be referred to as per-TRP timers.

Figure 2:
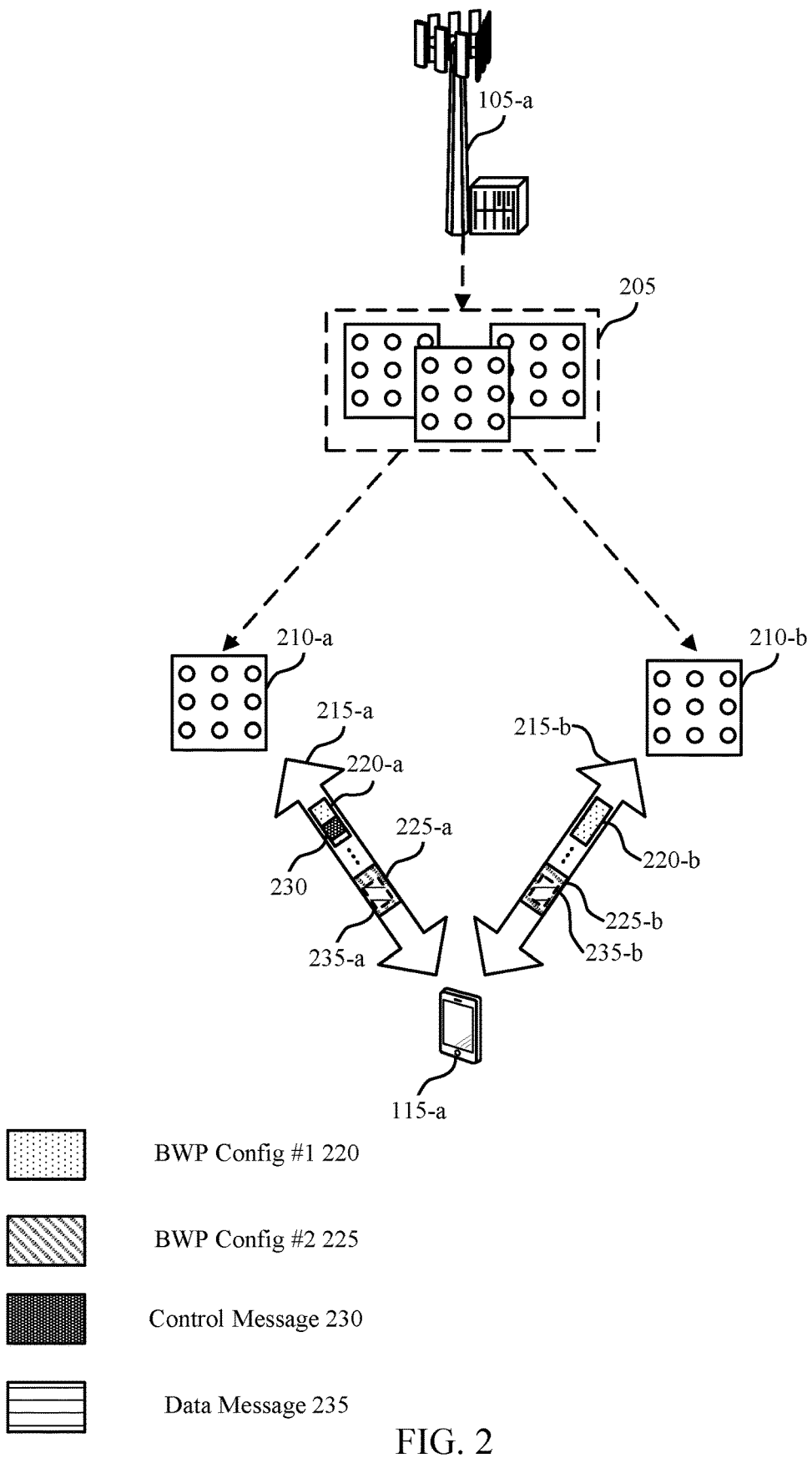
FIG. 2 illustrates an example of a wireless communications system that supports BWP configuration switching for multiple transceiver nodes in accordance with aspects of the present disclosure.

FIG. 2 illustrates an example of a wireless communications system 200 that supports BWP configuration switching for multiple transceiver nodes in accordance with aspects of the present disclosure. In some examples, wireless communications system 200 may implement aspects of wireless communications system 100. For example, wireless communications system 200 may include UE 115-a and base station 105-a, which may be examples of UEs 115 and base stations 105 as described with reference to FIG. 1.

Base station 105-a may include or be associated with a transceiver node cluster 205 and may communicate with UE 115-a via one or both transceiver nodes 210 included in the transceiver node cluster (e.g., transceiver nodes 210-a and 210-b). Transceiver nodes 210 and UE 115-a may establish communication links 215 (e.g., communication link 215-a for transceiver node 210-a and communication link 215-b for transceiver node 210-b). In some cases, transceiver node 210-a and transceiver node 210-b may each be an example of, or associated with, a base station 105 as described herein. In some cases, transceiver node 210-a and transceiver node 210-b may each be a TRP.

In one example, transceiver node 210-a may be configured with a BWP configuration 220-a and transceiver node 210-b may be configured with a BWP configuration 220-b. BWP configuration 220-a may span a same radio frequency bandwidth as BWP configuration 220-b or may span a different radio frequency bandwidth. Transceiver node 210-a may transmit a control message 230 or downlink communication over BWP configuration 220-a. The control message 230 may indicate to UE 115-a to switch an uplink BWP, a downlink BWP, or both associated with BWP configuration 220-a to an uplink BWP, a downlink BWP, or both associated with BWP configuration 225-a. In some cases, the control message 230 may indicate to UE 115-a to switch an uplink BWP, a downlink BWP, or both associated with BWP configuration 220-b to an uplink BWP, a downlink BWP, or both associated with BWP configuration 225-b. In other cases, UE 115-a may maintain BWP configuration 220-b after receiving control message 230. In either case, UE 115-a and the transceiver nodes 210 (e.g., transceiver node 210-a and transceiver node 210-b) may refrain from performing communications with each other during a switching gap between the UE 115-a using BWP configuration 220-a and using BWP configuration 225-a.

In one case, UE 115-a may switch from a BWP configuration 220 to a BWP configuration 225 regardless of which transceiver node 210 of the transceiver node cluster 205 sent the control message 230. In another case, UE 115-a may switch from a BWP configuration 220 to a BWP configuration 225 if a transceiver node 210 which sent the control message 230 is a master transceiver node, but may not switch from a BWP configuration 220 to a BWP configuration 225 if the transceiver node 210 which sent the control message is not a master transceiver node. In either case, a control message 230 may trigger UE 115-a to switch from BWP configurations 220 to BWP configurations 225 for each transceiver node 210 of the transceiver node cluster 205 (e.g., from BWP configuration 220-a to BWP configuration 225-a and from BWP configuration 220-b to BWP configuration 225-b). Alternatively, a control message 230 may trigger UE 115-a to switch from a BWP configuration 220 for just the transceiver node 210 which sent the control message 230. For instance, a control message 230 from transceiver node 210-a may indicate to UE 115-a to switch from BWP configuration 220-a to BWP configuration 225-a, but may not indicate to UE 115-a to switch from BWP configuration 220-b to BWP configuration 225-b (e.g., UE 115-a may maintain BWP configuration 225-b).

In some cases, UE 115-a may transmit or receive data message 235-a in BWP configuration 225-a. For instance, UE 115-a may transmit a PUSCH or receive a PDSCH in BWP configuration 225-a. If UE 115-a switched from BWP configuration 220-b to BWP configuration 225-b after receiving control message 230, the UE 115-a may receive or transmit data message 235-b in BWP configuration 225-b. Data message 235-b may be received instead of or along with data message 235-a.

UE 115-a may continue to use BWP configuration 225-b until UE 115-a receives another control message 230 that indicates a new BWP configuration or until a timer at UE 115-*a* expires. If UE 115-*a* receives a control message 230 that indicates a new BWP configuration, UE 115-*a* may switch from one or more BWP configurations 225 to new BWP configurations in a similar manner as described with reference to switching from BWP configurations 220 to BWP configurations 225. If UE 115-*a* uses a timer, UE 115-*a* may start the timer when UE 115-*a* begins using BWP configuration 225-*a* and may switch to a new BWP configuration when the timer ends.

In some cases, UE 115-*a* may use a timer that is common to a subset of the set of transceiver nodes 210 of the transceiver node cluster 205. In one example, UE 115-*a* may use a common timer for all transceiver nodes 210 of the transceiver node cluster 205. In such an example, UE 115-*a* may restart the common timer any time UE 115-*a* receives a control message 230 from a transceiver node 210 of the transceiver node cluster 205. In another example, UE 115-*a* may use a timer common to a subset of the transceiver nodes 210 of transceiver node cluster 205 (e.g., the master transceiver nodes 210 of transceiver node cluster 205). For instance, transceiver node 210-*a* may be a master transceiver node 210 and transceiver node 210-*b* may not be a master transceiver node 210. If UE 115-*a* receives a DCI from transceiver node 210-*a* before the timer common to the subset elapses, UE 115-*a* may restart the timer common to the subset. However, if UE 115-*a* receives a DCI from transceiver node 210-*b* before the timer common to the subset elapses, UE 115-*a* may not restart the timer common to the subset. It should be noted that the control message 230 may not be a BWP-switching control message 230.

In other cases, UE 115-*a* may use separate timers for each transceiver node 210 of the transceiver node cluster 205. For instance, UE 115-*a* may maintain a first timer for transceiver node 210-*a* and may maintain a second timer for transceiver node 210-*b*. Upon receiving a control message 230, UE 115-*a* may restart the timer corresponding to the transceiver node 210 which sent the control message 230. For instance, if UE 115-*a* receives a control message 230 from base station 105-*a* over BWP configuration 225-*a*, UE 115-*aq* may restart the timer corresponding to transceiver node 210-*a*. UE 115-*a* may switch from one or more BWP configurations 225 to one or more new BWP configurations upon expiration of any of the separate timers. For instance, if the second timer expires before the first timer, UE 115-*a* may switch from the one or more BWP configurations upon expiration of the second timer. It should be noted that the control message 230 may not be a BWP-switching control message 230.

Figure 3:
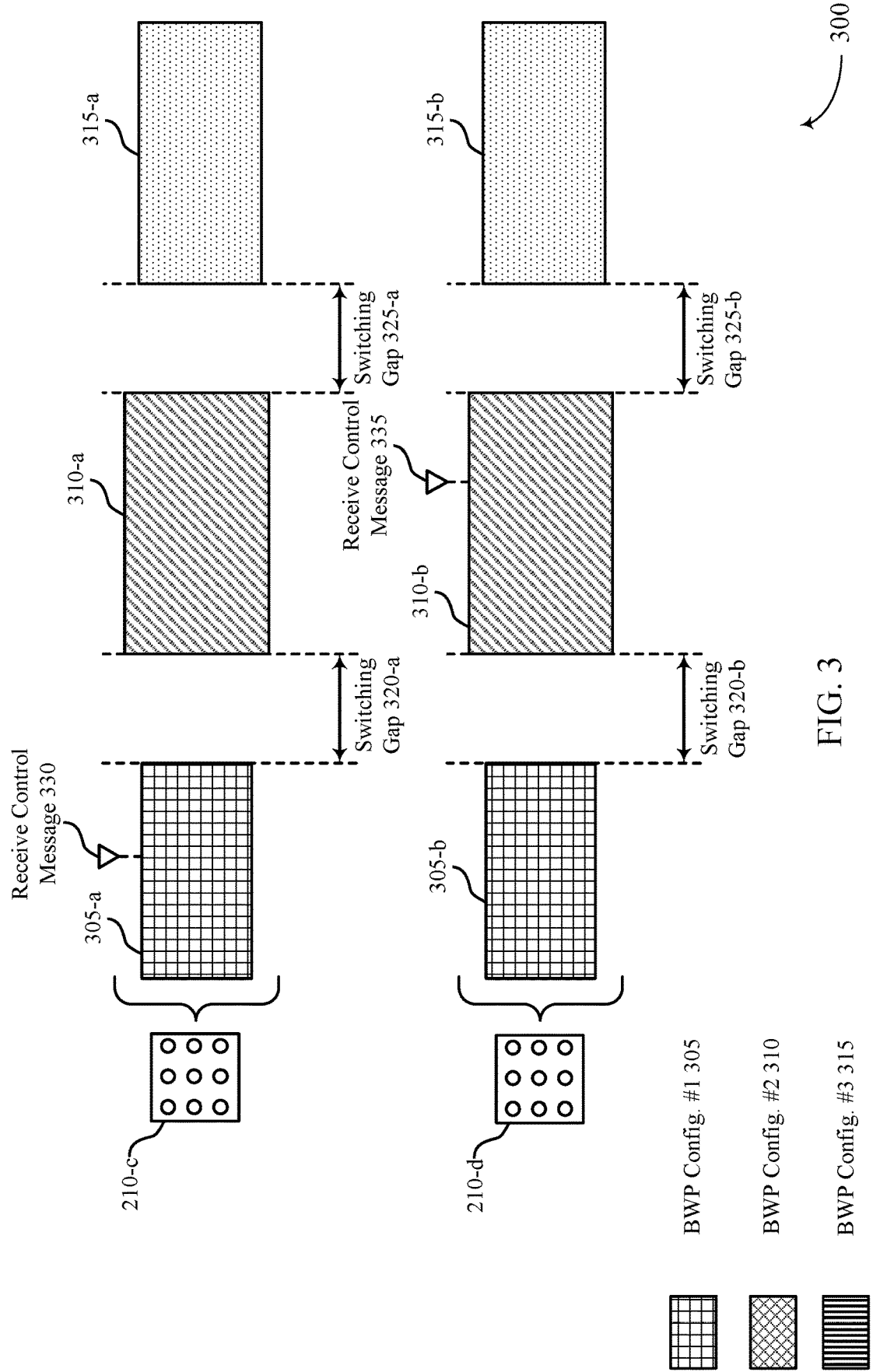
FIG. 3 illustrates an example of a BWP switching scheme that supports BWP configuration switching for multiple transceiver nodes in accordance with aspects of the present disclosure.

FIG. 3 illustrates an example of a BWP switching scheme 300 that supports BWP configuration switching for multiple transceiver nodes in accordance with aspects of the present disclosure. In some examples, BWP switching scheme 300 may implement aspects of wireless communications systems 100 and 200. For instance, BWP switching scheme 300 may include transceiver nodes 210-*c* and 210-*d*, which may be examples of aspects of transceiver nodes 210 as described with reference to FIG. 2. Transceiver nodes 210-*c* and 210-*d* may make up or be part of a set of transceiver nodes 210 making up a transceiver node cluster 205. BWP switching scheme 300 may involve a UE 115 switching from initial BWP configurations to updated BWP configurations for all of or a subset of the set of transceiver nodes 210 upon receiving a control message or downlink communication from one of the transceiver nodes 210 of the set of transceiver nodes 210.

Transceiver node 210-*c* and transceiver node 210-*d* may operate initially according to BWP configurations 305. For instance, transceiver node 210-*c* may operate according to BWP configuration 305-*a* and transceiver node 210-*d* may operate according to BWP configuration 305-*b*. BWP configuration 305-*a* and BWP configuration 305-*b* may span the same radio frequency bandwidth. At 330, transceiver node 210-*c* may transmit a BWP-switching control message to a UE 115 which indicates that UE 115 is to switch from BWP configurations 305 to BWP configurations 310 for transceiver nodes 210-*c* and 210-*d* (e.g., for each transceiver node 210 of a transceiver node cluster 205, which may include other transceiver nodes other than transceiver nodes 210-*c* and 210-*d* pictured). BWP configurations 305, as shown in FIG. 3, may depict downlink BWPs.

The UE 115 may switch to BWP configurations 310 (e.g., BWP configuration 310-*a* and 310-*b*) for transceiver nodes 210-*c* and 210-*d* over switching gaps 320. For instance, transceiver node 210-*c* may switch to BWP configuration 310-*a* over switching gap 320-*a* and transceiver node 210-*d* may switch to BWP configuration 310-*b* over switching gap 320-*b*. During switching gaps 320, the transceiver nodes 210 and the UE 115 may not perform communications with each other. In some cases, switching gap 320-*a* and 320-*b* may span the same time. BWP configuration 310-*a* and 310-*b* may span a same radio frequency bandwidth. Upon the UE 115 switching to BWP configurations 310, transceiver node 210-*c* or 210-*d* may receive a data message (e.g., a PUSCH) from or transmit a data message (e.g., a PDSCH) to the UE 115 over BWP configuration 310-*a* or 310-*b*. The PDSCH or PUSCH may correspond to (e.g., be scheduled by) the BWP-switching control message. At 335, the UE 115 may receive another BWP-switching control message from one of the transceiver nodes 210 (e.g., transceiver node 210-*b*) over a BWP configuration 310 (e.g., BWP configuration 310-*b*). BWP configurations 310, as shown in FIG. 3, may depict downlink BWPs or uplink BWPs.

The UE may switch to BWP configurations 315 (e.g., BWP configuration 315-*a* and 315-*b*) for transceiver nodes 210-*c* and 210-*d* over switching gaps 325. For instance, transceiver node 210-*c* may switch to BWP configuration 315-*a* over switching gap 325-*a* and transceiver node 210-*d* may switch to BWP configuration 315-*b* over switching gap 325-*b*. During switching gaps 325, the transceiver nodes 210 and the UE 115 may not perform communications with each other. In some cases, switching gap 325-*a* and 325-*b* may span the same time. BWP configuration 315-*a* and 315-*b* may span a same radio frequency bandwidth. Upon the UE 115 switching to BWP configurations 315, transceiver node 210-*c* or 210-*d* may receive a data message (e.g., a PUSCH) from or transmit a data message (e.g., a PDSCH) to the UE 115 over BWP configuration 315-*a* or 315-*b*. The PDSCH or the PUSCH may correspond to (e.g., be scheduled by) the new BWP-switching control message. BWP configurations 315, as shown in FIG. 3, may depict downlink BWPs or uplink BWPs.

Figure 4:
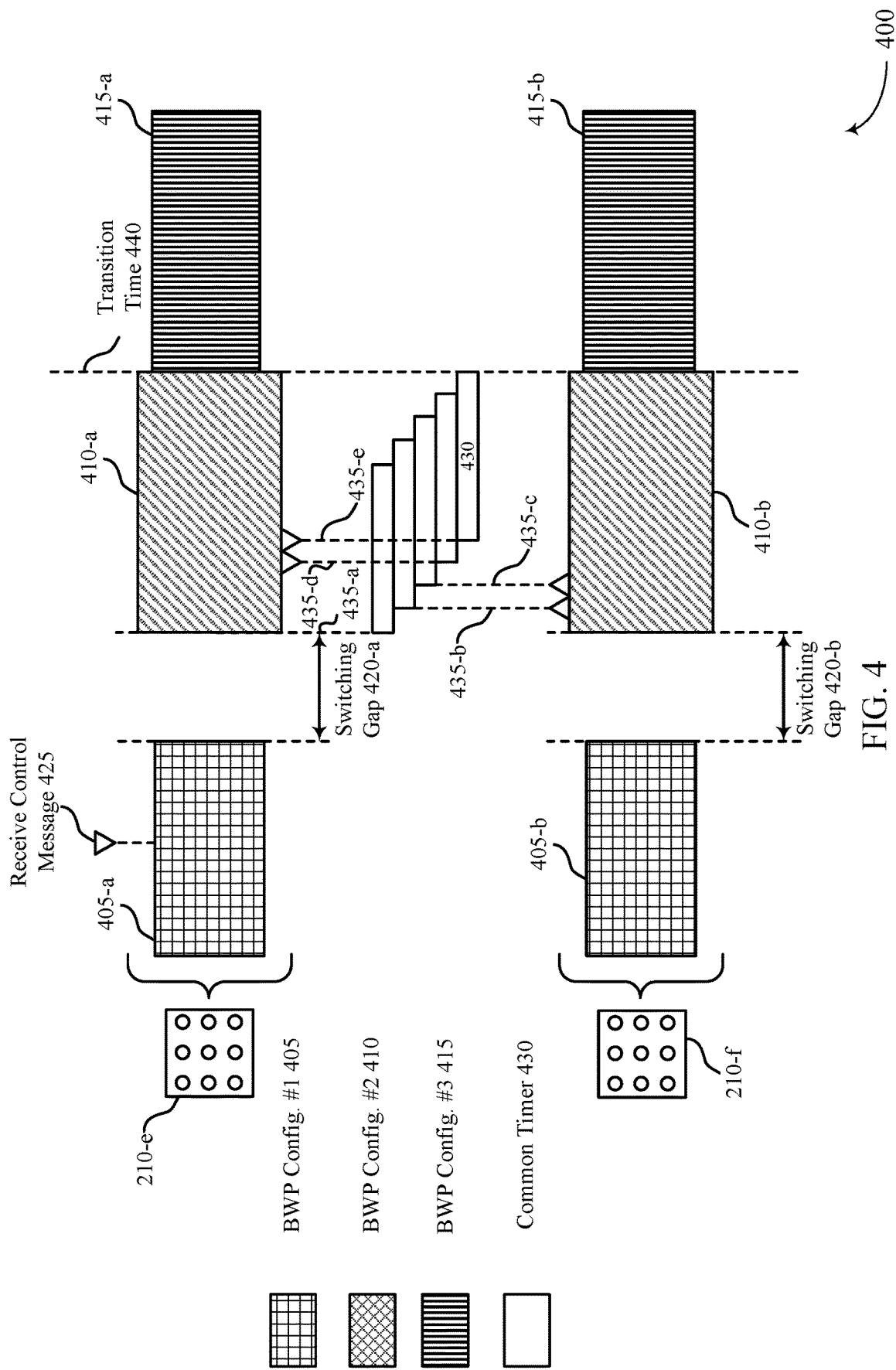
FIG. 4 illustrates an example of a BWP switching scheme that supports BWP configuration switching for multiple transceiver nodes in accordance with aspects of the present disclosure.

FIG. 4 illustrates an example of a BWP switching scheme 400 that supports BWP configuration switching for multiple transceiver nodes in accordance with aspects of the present disclosure. In some examples, BWP switching scheme 400 may implement aspects of wireless communications systems 100 and 200. For instance, BWP switching scheme 400 may include transceiver nodes 210-*e* and 210-*f*, which may be examples of aspects of transceiver nodes 210 as described with reference to FIG. 2. Transceiver nodes 210-*e* and 210-*f* may make up or be part of a set of transceiver nodes 210 making up a transceiver node cluster 205. BWP switching scheme 400 may involve a UE 115 switching from active BWP configurations to default BWP configurations for each transceiver node 210 of the set of transceiver nodes 210 upon the expiration of a timer common to each of the transceiver nodes 210 of the set of transceiver nodes 210.

Transceiver node 210-e and transceiver node 210-f may operate initially according to BWP configurations 405. For instance, transceiver node 210-e may operate according to BWP configuration 405-a and transceiver node 210-f may operate according to BWP configuration 405-b. BWP configuration 405-a and BWP configuration 405-b may span the same radio frequency bandwidth. At 425, transceiver node 210-e may transmit a BWP-switching control message or downlink communication to a UE 115 which indicates that UE 115 is to switch from BWP configurations 405 to BWP configurations 410 for transceiver nodes 210-e and 210-f (e.g., for each transceiver node 210 of a transceiver node cluster 205 containing transceiver node 210-e and 210-f). BWP configurations 405, as shown in FIG. 4, may depict downlink BWPs.

The UE 115 may switch to BWP configurations 410 (e.g., BWP configuration 410-a and 410-b) for transceiver nodes 210-e and 210-f over switching gaps 420. For instance, transceiver node 210-e may switch to BWP configuration 410-a over switching gap 420-a and transceiver node 210-f may switch to BWP configuration 410-b over switching gap 420-b. During switching gaps 420, the transceiver nodes 210 and the UE 115 may not perform communications with each other. In some cases, switching gap 420-a and 420-b may span the same time. BWP configuration 410-a and 410-b may span a same radio frequency bandwidth. Upon the UE 115 switching to BWP configurations 410, transceiver node 210-e or 210-f may receive a data message (e.g., a PUSCH) from or transmit a data message (e.g., a PDSCH) to the UE 115 over BWP configuration 410-a or 410-b. The PDSCH or PUSCH may correspond to (e.g., be scheduled by) the BWP-switching control message.

At 435-a, the UE 115 may start a common timer 430. The common timer 430 may be common to all transceiver nodes 210 within the transceiver node cluster 205 containing transceiver nodes 210-e and 210-f. If the UE 115 receives a control message (e.g., a control message that is not a BWP-switching control message) or another type of downlink communication, the UE 115 may restart the common timer 430. For instance, at 435-b, the UE 115 may receive a control message from transceiver node 210-f and may restart the common timer 430. At 435-c, the UE 115 may receive another control message from transceiver node 210-f and may restart the common timer 430. At 435-d, the UE 115 may receive a control message from transceiver node 210-e and may restart the common timer 430. At 435-e, the UE 115 may receive another control message from transceiver node 210-e and may restart the common timer 430. In between 435-e and transition time 440, the UE 115 may not receive additional control messages from any transceiver node 210 (e.g., transceiver nodes 210-e or 210-f) of the transceiver node cluster 205.

At transition time 440, the UE 115 may switch from BWP configurations 410 to BWP configurations 415 (e.g., a default configuration) for each transceiver node 210 within the transceiver node cluster 205 containing transceiver nodes 210-e and 210-f. For instance, the UE 115 may switch from BWP configurations 410-a and 410-b for transceiver nodes 210-e and 210-f, respectively, to BWP configurations 415-a and 415-b for transceiver nodes 210-e and 210-f, respectively. The UE 115 may make the transition once the common timer 430 expires, which, in the present example, may occur due to UE 115 not receiving any more control messages from any transceiver nodes 210 of the transceiver node cluster 205 in between 435-e and transition time 440. In some cases, BWP configurations 415 may span the same radio frequency bandwidths as BWP configurations 405.

Figure 5:
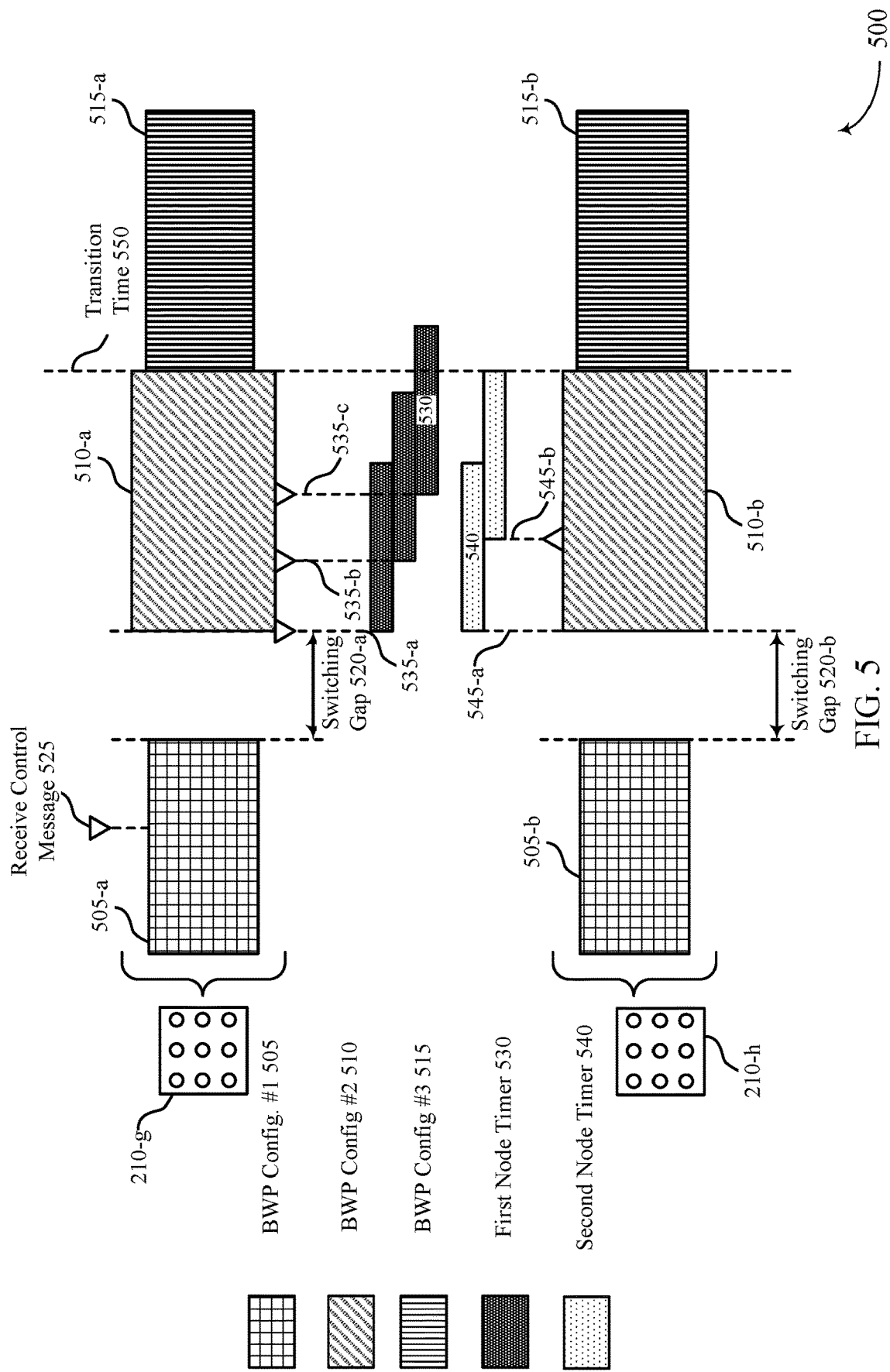
FIG. 5 illustrates an example of a BWP switching scheme that supports BWP configuration switching for multiple transceiver nodes in accordance with aspects of the present disclosure.

FIG. 5 illustrates an example of a BWP switching scheme 500 that supports BWP configuration switching for multiple transceiver nodes in accordance with aspects of the present disclosure. In some examples, BWP switching scheme 500 may implement aspects of wireless communications systems 100 and 200 For instance, BWP switching scheme 500 may include transceiver nodes 210-g and 210-h, which may be examples of aspects of transceiver nodes 210 as described with reference to FIG. 2. Transceiver nodes 210-g and 210-h may make up or be part of a set of transceiver nodes 210 making up a transceiver node cluster 205. BWP switching scheme 500 may involve a UE 115 switching from active BWP configurations to default BWP configurations for every transceiver node 210 of the set of transceiver nodes 210 upon expiration of a first timer in a set of separate timers corresponding to each transceiver node 210 of the set of transceiver nodes 210.

Transceiver node 210-g and transceiver node 210-h may operate initially according to BWP configurations 505. For instance, transceiver node 210-g may operate according to BWP configuration 505-a and transceiver node 210-h may operate according to BWP configuration 505-b. BWP configuration 505-a and BWP configuration 505-b may span the same radio frequency bandwidth. At 525, transceiver node 210-g may transmit a BWP-switching control message or downlink communication to a UE 115 which indicates that the UE 115 is to switch from BWP configurations 505 to BWP configurations 510 for transceiver nodes 210-g and 210-h (e.g., for each transceiver node 210 of a transceiver node cluster 205 containing transceiver node 210-g and 210-h). BWP configurations 505, as shown in FIG. 5, may depict downlink BWPs.

The UE 115 may switch to BWP configurations 510 (e.g., BWP configuration 510-a and 510-b) for transceiver nodes 210-g and 210-h over switching gaps 520. For instance, transceiver node 210-g may switch to BWP configuration 510-a over switching gap 520-a and transceiver node 210-h may switch to BWP configuration 510-b over switching gap 520-b. During switching gaps 520, the transceiver nodes 210 and the UE 115 may not perform communications with each other. In some cases, switching gap 520-a and 520-b may span the same time. BWP configuration 510-a and 510-b may span a same radio frequency bandwidth. Upon the UE 115 switching to BWP configurations 510, transceiver node 210-g or 210-h may receive a data message (e.g., a PUSCH) from or transmit a data message (e.g., a PDSCH) to the UE 115 over BWP configuration 510-a or 510-b. The PDSCH or PUSCH may correspond to (e.g., be scheduled by) the BWP-switching control message.

At 535-a, the UE 115 may start a first node timer 530 for transceiver node 210-g and, at 545-a, the UE 115 may start a second node timer 540 for transceiver node 210-h. In cases where there are more than two transceiver nodes 210 in the transceiver node cluster 205, the UE 115 may start a separate timer for each transceiver node 210 of the transceiver node cluster 205. If the UE receives a control message (e.g., a control message that is not a BWP-switching control message), the UE 115 may restart the timer associated with the transceiver node that sent the control message. For instance, at 535-b, the UE 115 may receive a control message from transceiver node 210-g and may restart the first node timer 530. At 545-b, the UE 115 may receive a control message from transceiver node 210-h and may restart the second node timer 540. At 535-c, the UE 115 may receive another control message from transceiver node 210-*g* and may restart the first node timer 530. In between 545-*b* and transition time 550, the UE may not receive additional control messages from transceiver node 210-*h*.

At transition time 550, the UE 115 may switch from BWP configurations 510 to BWP configurations 515 (e.g., default BWP configurations) for each transceiver node 210 within the transceiver node cluster 205. For instance, the UE 115 may switch from BWP configurations 510-*a* and 510-*b* for transceiver nodes 210-*g* and 210-*h*, respectively, to BWP configurations 515-*a* and 515-*b* for transceiver nodes 210-*g* and 210-*h*, respectively. The UE 115 may make the transition based on the expiration of any one of the separate timers for each transceiver node. For instance, in between 545-*b* and transition time 550, the UE 115 may not receive additional control messages from transceiver node 210-*h*. As such, even if the UE 115 may have received a control message from transceiver node 210-*g* (e.g., at 535-*c*) in between 545-*b* and transition time 550, the UE 115 may switch from BWP configurations 510 to BWP configurations 515 upon expiration of the second node timer 540. In some cases, BWP configurations 515 may span the same radio frequency bandwidths as BWP configurations 505.

Figure 6:
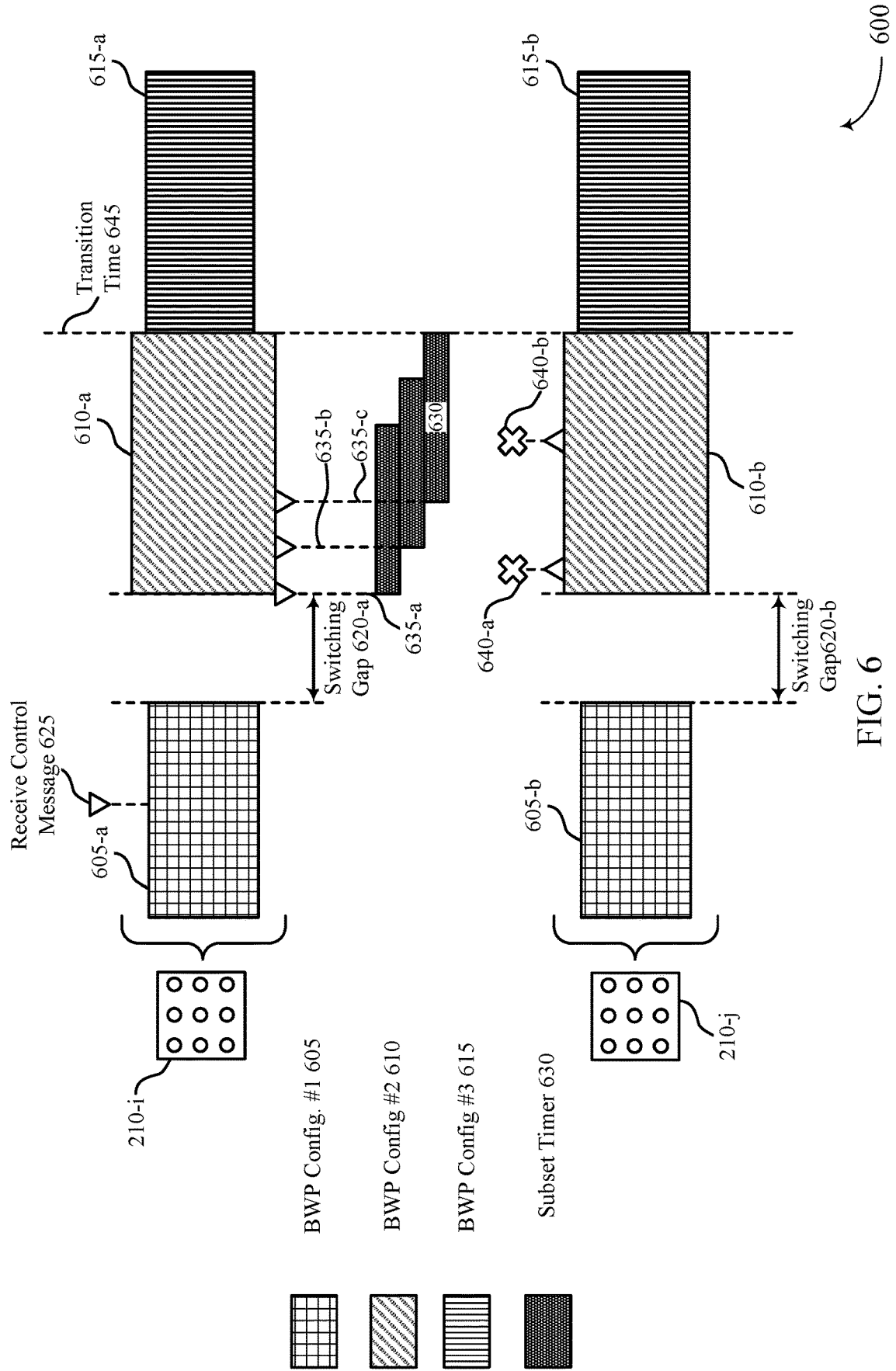
FIG. 6 illustrates an example of a BWP switching scheme that supports BWP configuration switching for multiple transceiver nodes in accordance with aspects of the present disclosure.

FIG. 6 illustrates an example of a BWP switching scheme 600 that supports BWP configuration switching for multiple transceiver nodes in accordance with aspects of the present disclosure. In some examples, BWP switching scheme 600 may implement aspects of wireless communications systems 100 and 200. For instance, BWP switching scheme 600 may include transceiver nodes 210-*i* and 210-*j*, which may be examples of aspects of transceiver nodes 210 as described with reference to FIG. 2. Transceiver nodes 210-*i* and 210-*j* may make up or be part of a set of transceiver nodes 210 making up a transceiver node cluster 205. BWP switching scheme 600 may involve a UE 115 switching from active BWP configurations to default BWP configurations for each transceiver node 210 of the set of transceiver nodes 210 upon the expiration of a timer common to a subset of the set of transceiver nodes 210 (e.g., a timer common to master transceiver nodes 210 within the set of transceiver nodes 210).

Transceiver node 210-*i* and transceiver node 210-*j* may operate initially according to BWP configurations 605. For instance, transceiver node 210-*i* may operate according to BWP configuration 605-*a* and transceiver node 210-*j* may operate according to BWP configuration 605-*b*. BWP configuration 605-*a* and BWP configuration 605-*b* may span the same radio frequency bandwidth. At 625, transceiver node 210-*i* may transmit a BWP-switching control message or downlink communication to a UE 115 which indicates that the UE 115 is to switch from BWP configurations 605 to BWP configurations 610 for transceiver nodes 210-*i* and 210-*j* (e.g., for each transceiver nodes 210 of a transceiver node cluster 205 containing transceiver node 210-*i* and 210-*j*). BWP configurations 605, as shown in FIG. 6, may depict downlink BWPs.

The UE 115 may switch to BWP configurations 610 (e.g., BWP configuration 610-*a* and 610-*b*) for transceiver nodes 210-*i* and 210-*j* over switching gaps 620. For instance, transceiver node 210-*i* may switch to BWP configuration 610-*a* over switching gap 620-*a* and transceiver node 210-*j* may switch to BWP configuration 610-*b* over switching gap 620-*b*. During switching gaps 620, the transceiver nodes 210 and the UE 115 may not perform communications with each other. In some cases, switching gap 620-*a* and 620-*b* may span the same time. BWP configuration 610-*a* and 610-*b* may span a same radio frequency bandwidth. Upon the UE 115 switching to BWP configurations 610, transceiver node 210-*i* or 210-*j* may receive a data message (e.g., a PUSCH) from or transmit a data message (e.g., a PDSCH) to the UE 115 over BWP configurations 610-*a* or 610-*b*. The PDSCH or PUSCH may correspond to (e.g., be scheduled by) the BWP-switching control message.

At 635-*a*, the UE 115 may start a subset timer 630. The subset timer 630 may be common to a subset of the transceiver nodes 210 of the transceiver node cluster 205 (e.g., the transceiver nodes 210 that are master transceiver nodes 210). If the UE 115 receives a control message (e.g., a control message that is not a BWP-switching control message) from a transceiver node 210 within the subset, the UE 115 may restart the subset timer 630. However, if the UE 115 receives a control message from a transceiver node 210 not within the subset, the UE 115 may maintain the subset timer 630 (e.g., the subset timer 630 may not be restart). In one example, transceiver node 210-*i* may be within the subset (e.g., transceiver node 210-*i* may be a master transceiver node 210) and transceiver node 210-*j* may be outside of the subset (e.g., transceiver node 210-*j* may not be a master transceiver node 210). At 640-*a*, the UE 115 may receive a control message from transceiver node 210-*j* and may maintain the subset timer 630. At 635-*b*, the UE 115 may receive a control message from transceiver node 210-*i* and may restart the subset timer 630. At 635-*c*, the UE 115 may receive another control message from transceiver node 210-*i* and may restart the subset timer 630. At 640-*b*, the UE 115 may receive another control message from transceiver node 210-*i* and may restart the subset timer 630. At 640-*b*, the UE 115 may receive another control message from transceiver node 210-*j* and may maintain the subset timer 630. In between 635-*c* and transition time 645, the UE 115 may not receive additional control messages from transceiver nodes 210 that are within the subset.

At transition time 645, the UE 115 may switch from BWP configurations 610 to BWP configurations 615 (e.g., default BWP configurations) for each transceiver node 210 within the transceiver node cluster 205. For instance, the UE 115 may switch from BWP configurations 610-*a* and 610-*b* for transceiver nodes 210-*i* and 210-*j*, respectively, to BWP configurations 615-*a* and 615-*b* for transceiver nodes 210-*i* and 210-*j*, respectively. The UE 115 may make the switch upon the expiration of the subset timer 630, which may occur due to the UE 115 not receiving additional control messages from transceiver nodes 210 within the subset in between 635-*c* and transition time 645. In some cases, BWP configurations 615 may span the same radio frequency bandwidths as BWP configurations 605.

Figure 7:
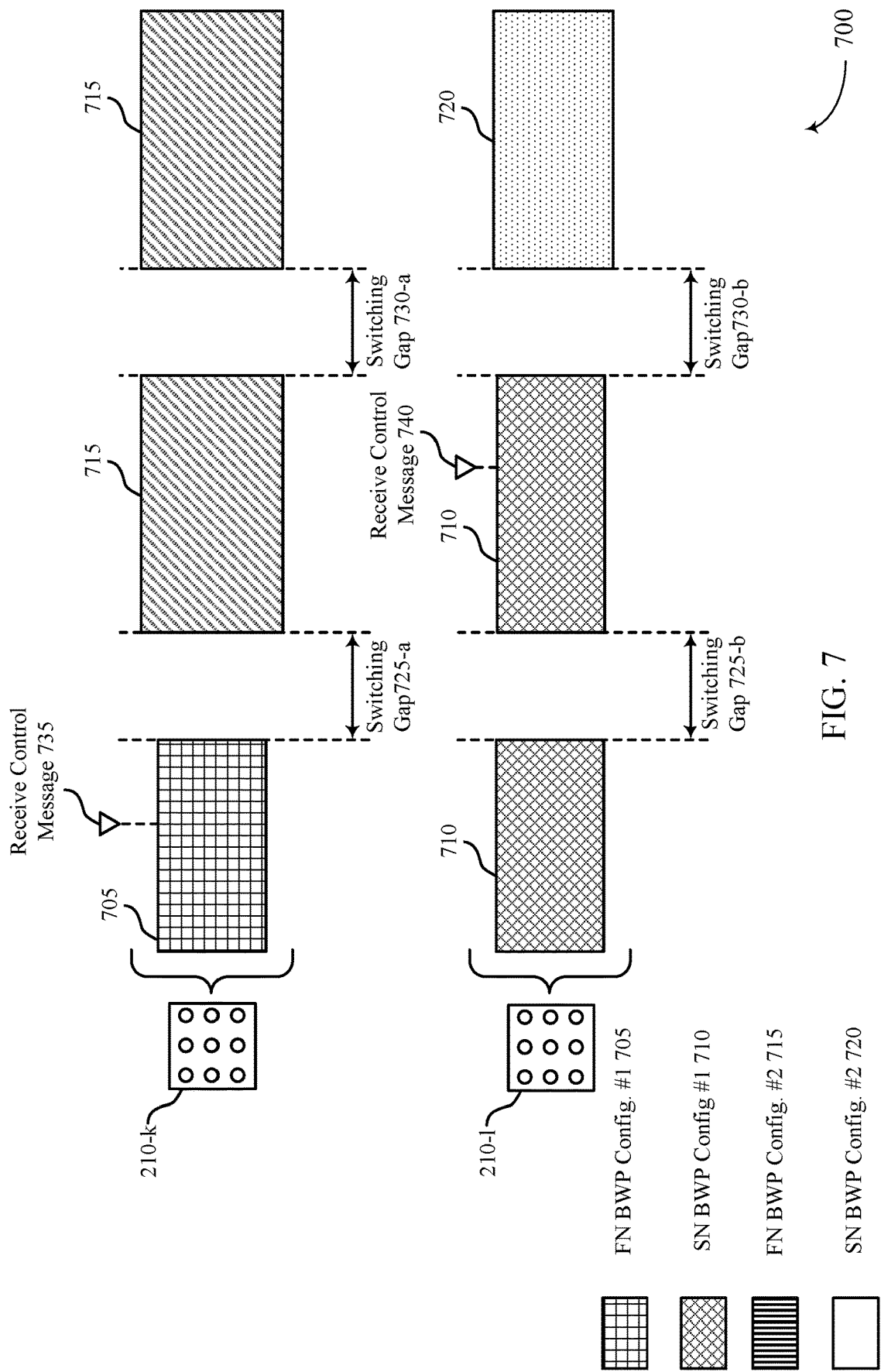
FIG. 7 illustrates an example of a BWP switching scheme that supports BWP configuration switching for multiple transceiver nodes in accordance with aspects of the present disclosure.

FIG. 7 illustrates an example of a BWP switching scheme 700 that supports BWP configuration switching for multiple transceiver nodes in accordance with aspects of the present disclosure. In some examples, BWP switching scheme 700 may implement aspects of wireless communications systems 100 and 200. For instance, transceiver nodes 210-*k* and 210-1 may be examples of aspects of transceiver nodes 210 as described with reference to FIG. 2. For instance, BWP switching scheme 700 may include transceiver nodes 210-*k* and 210-1, which may be examples of aspects of transceiver nodes 210 as described with reference to FIG. 2. Transceiver nodes 210-*k* and 210-1 may make up or be part of a set of transceiver nodes 210 making up a transceiver node cluster 205. BWP switching scheme 700 may involve a UE 115 switching from a first BWP configuration to a second BWP configuration for a first transceiver node 210 of the set of transceiver nodes 210 upon reception of a control message or downlink communication from the first transceiver node 210, but refraining from switching from BWP configurations for the other transceiver nodes 210 of the set of transceiver nodes 210.

Transceiver node 210-k and transceiver node 210-1 may operate according to separate BWP configurations. For instance, transceiver node 210-k may operate according to first node BWP configuration 705 and transceiver node 210-1 may operate according to second node BWP configuration 710. First node BWP configuration 705 and second node BWP configuration 710 may span different radio frequency bandwidths, but may share a center frequency. At 735, transceiver node 210-k may transmit a BWP-switching control message or downlink communication to a UE 115 which indicates that UE 115 is to switch from first node BWP configuration 705 to a first node BWP configuration 715 for transceiver node 210-k.

The UE 115 may switch to first node BWP configuration 715 for transceiver node 210-k over switching gap 725-a. The UE 115 may refrain from performing communications with transceiver node 210-k during switching gap 725-a and may refrain from performing communications with transceiver node 210-1 during switching gap 725-b. In some cases, switching gap 725-a and 725-b may span a same time. After switching gaps 725, the UE 115 may perform communications with transceiver node 210-k according to first node BWP configuration 715 and the UE 115 may perform communications with transceiver node 210-1 according to second node BWP configuration 710. Upon the UE 115 switching to first node BWP configuration 715, transceiver node 210-k or 210-1 may receive a data message (e.g., a PUSCH) or transmit a data message (e.g., a PDSCH) to the UE 115 over BWP configurations 715 or 710. The PDSCH or PUSCH may correspond to (e.g., be scheduled by) the BWP-switching control message. At 740, the UE 115 may receive another BWP-switching control message from one of the transceiver nodes 210 (e.g., transceiver node 210-1 in the present example) over a BWP configuration (e.g., second node BWP configuration 710 in the present example).

The UE 115 may switch to second node BWP configuration 720 for transceiver node 210-1 over switching gap 730-b. The UE 115 may refrain from performing communications with transceiver node 210-k during switching gap 730-a and may refrain from performing communications with transceiver node 210-1 during switching gap 730-b. In some cases, switching gap 730-a and 730-b may span a same time. After switching gap 730-b, the UE 115 may continue to perform communications with transceiver node 210-k according to first node BWP configuration 715 and the UE 115 may perform communications with transceiver node 210-1 according to second node BWP configuration 720. Upon the UE 115 switching to second node BWP configuration 720, transceiver node 210-k or 210-1 may receive a data message (e.g., a PUSCH) or transmit a data message (e.g., a PDSCH) to the UE 115 over BWP configurations 715 or 720. The PDSCH or PUSCH may correspond to (e.g., be scheduled by) the BWP-switching control message. In some cases, BWP configuration 715 and 720 may share a same center frequency. Transceiver node 210-k and 210-1 may coordinate with each other to ensure BWP configurations 715 and 720 share the same center frequency.

In some cases, the above set-up may be modified to enable the UE 115 to switch BWP configurations according to one or more timers. For instance, upon switching from first node BWP configuration 705 to first node BWP configuration 715, the UE 115 may begin a timer. Each time the UE 115 receives a control message from transceiver node 210-k, the UE 115 may restart the timer. If the timer expires, the UE may switch first node BWP configuration 715 to another first node BWP configuration (e.g., a default configuration).

In general, the transceiver nodes 210 may coordinate on BWP switching and BWP configuration. For instance, as mentioned above, the transceiver nodes 210-k and 210-1 may coordinate with each other to ensure that BWP configurations 715 and 720 share the same center frequency. The behavior of the UE 115 when BWP-switching is inconsistent between different transceiver nodes 210 (e.g., when switching a first node BWP configuration for transceiver node 210-k does not switch a second node BWP configuration for transceiver node 210-1) may depend on UE-implementation.

Figure 8:
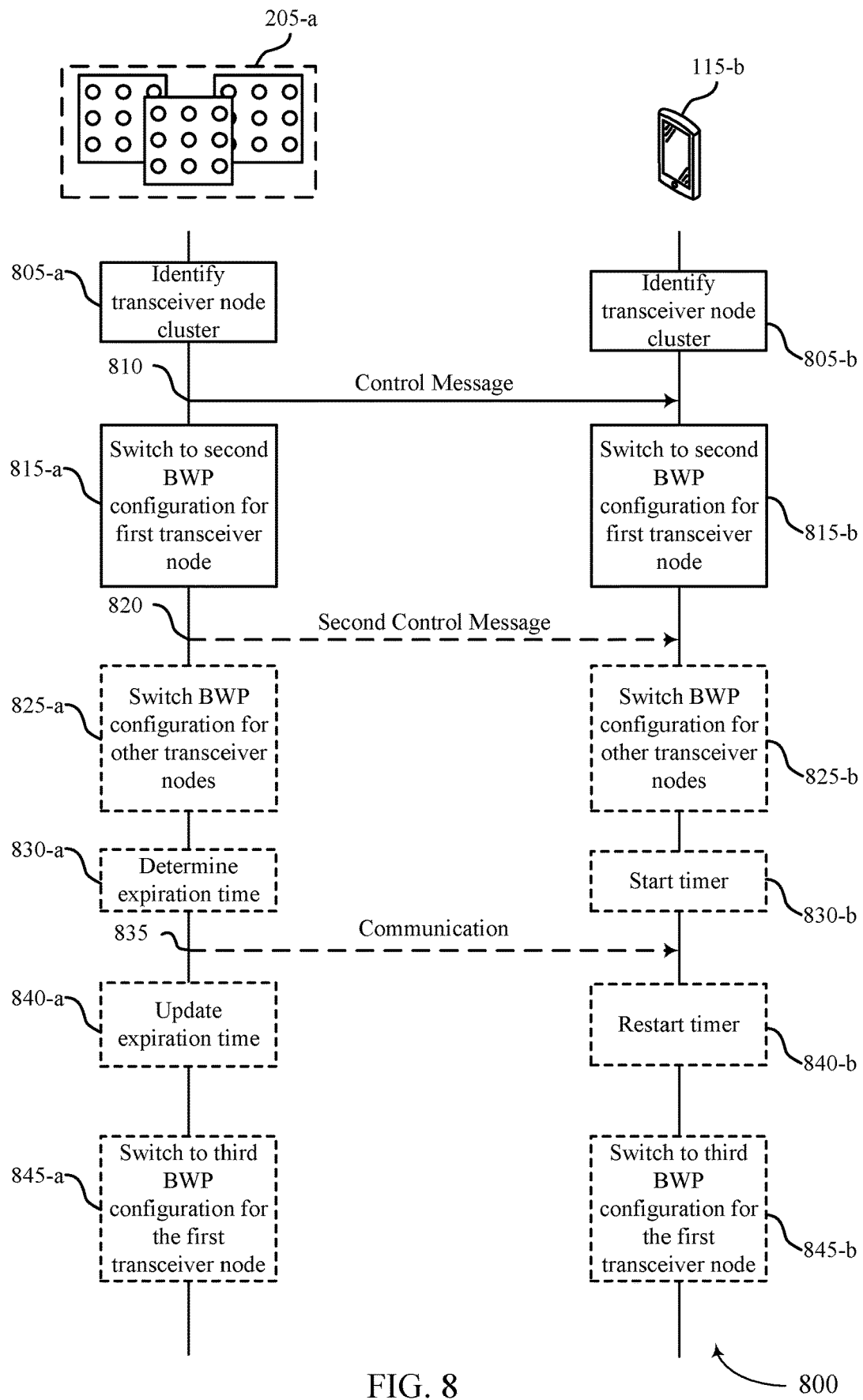
FIG. 8 illustrates an example of a process flow that supports BWP configuration switching for multiple transceiver nodes in accordance with aspects of the present disclosure.

FIG. 8 illustrates an example of a process flow 800 that supports BWP configuration switching for multiple transceiver nodes in accordance with aspects of the present disclosure. In some examples, process flow 800 may implement aspects of wireless communications systems 100 and 200. For instance, process flow 800 may be implemented by UE 115-b, which may be an example of aspects of a UE 115 as described with reference to FIG. 1, and transceiver node cluster 205-a, which may be an example of a transceiver node cluster 205 as described with reference to FIG. 2.

At 805-a, transceiver node cluster 205-a may be identified by a set of transceiver nodes that make up the transceiver node cluster 205-a for communication with UE 115-b. At 805-b, UE 115-b may identify the transceiver node cluster 205.

At 810, a first transceiver node 210 of the transceiver node cluster 205-a may transmit a control message (e.g., a DCI) or downlink communication. UE 115-b may receive the control message or downlink communication.

At 815-a, the transceiver node cluster 205-a may switch a first BWP configuration for the first transceiver node 210 to a second BWP configuration for the first transceiver node 210. At 815-b, UE 115-b may switch a first BWP configuration for the first transceiver node 210 to a second BWP configuration for the first transceiver node 210.

At 820, a second transceiver node 210 of transceiver node cluster 205-a may transmit a second control message (e.g., a second DCI) or downlink communication. UE 115-b may receive the second control message or downlink communication.

At 825-a, transceiver node cluster 205-a may switch BWP configurations for other transceiver nodes 210 of the set of transceiver nodes 210. The BWP configurations may be switched after transmitting the control message at 810 or may be switched after transmitting the second control message at 820. At 825-b, UE 115-b may switch BWP configurations for other transceiver nodes 210 of the set of transceiver nodes 210. The BWP configurations may be switched based on the control message at 810 or may be switched based on the second control message at 820.

At 830-a, transceiver node cluster 205-a may determine an expiration time of one or more timers for one or more transceiver nodes 210 of the set of transceiver nodes 210 based on switching from the first BWP configuration for the first transceiver node 210 to the second BWP configuration for the first transceiver node 210. At 830-b, UE 115-a may start the one or more timers based on switching from the first BWP configuration for the first transceiver node 210 to the second BWP configuration for the first transceiver node 210. The one or more timers may be a timer common to each transceiver node 210 of the set of transceiver nodes 210, a timer common to a subset of the set of transceiver nodes 210 (e.g., the transceiver nodes 210 that are master transceiver nodes 210), or a set of separate timers for each transceiver node 210 of the set of transceiver nodes 210.

At 835, a transceiver node 210 of the transceiver node cluster may transmit a communication (e.g., a control message such as a DCI). UE 115-*b* may receive the communication.

At 840-*a*, transceiver node cluster 205-*a* may update the expiration time for at least one of the one or more timers based on transmitting the communication. At 840-*b*, UE 115-*b* may restart the at least one of the one or more timers based on receiving the communication. If the one or more timers is a timer common to all of or the subset of the set of transceiver nodes 210, UE 115-*b* may restart the one or more timers if the communication is from a transceiver node 210 within the set of transceiver nodes 210 or within the subset of the set of transceiver nodes 210. If the one or more timers are separate timers for each transceiver node 210, UE 115-*b* may restart the timer corresponding to the transceiver node 210 which sent the communication.

At 845-*a*, transceiver node cluster 205-*a* may switch from the second BWP configuration for the first transceiver node 210 to a third BWP configuration for the first transceiver node (e.g., a default BWP configuration). At 845-*b*, UE 115-*b* may switch from the second BWP configuration for the first transceiver node 210 to a third BWP configuration for the first transceiver node (e.g., a default BWP configuration). UE 115-*b* may switch from the second BWP configuration based on the one or more timers expiring. If the one or more timers is a timer common to all of or the subset of the set of transceiver nodes 210, UE 115-*b* switch from the second BWP configuration based on the timer expiring. If the one or more timers are separate timers for each transceiver node 210, UE 115-*b* may switch from the second BWP configuration after a first timer of the set of separate timers expires.

Figure 9:
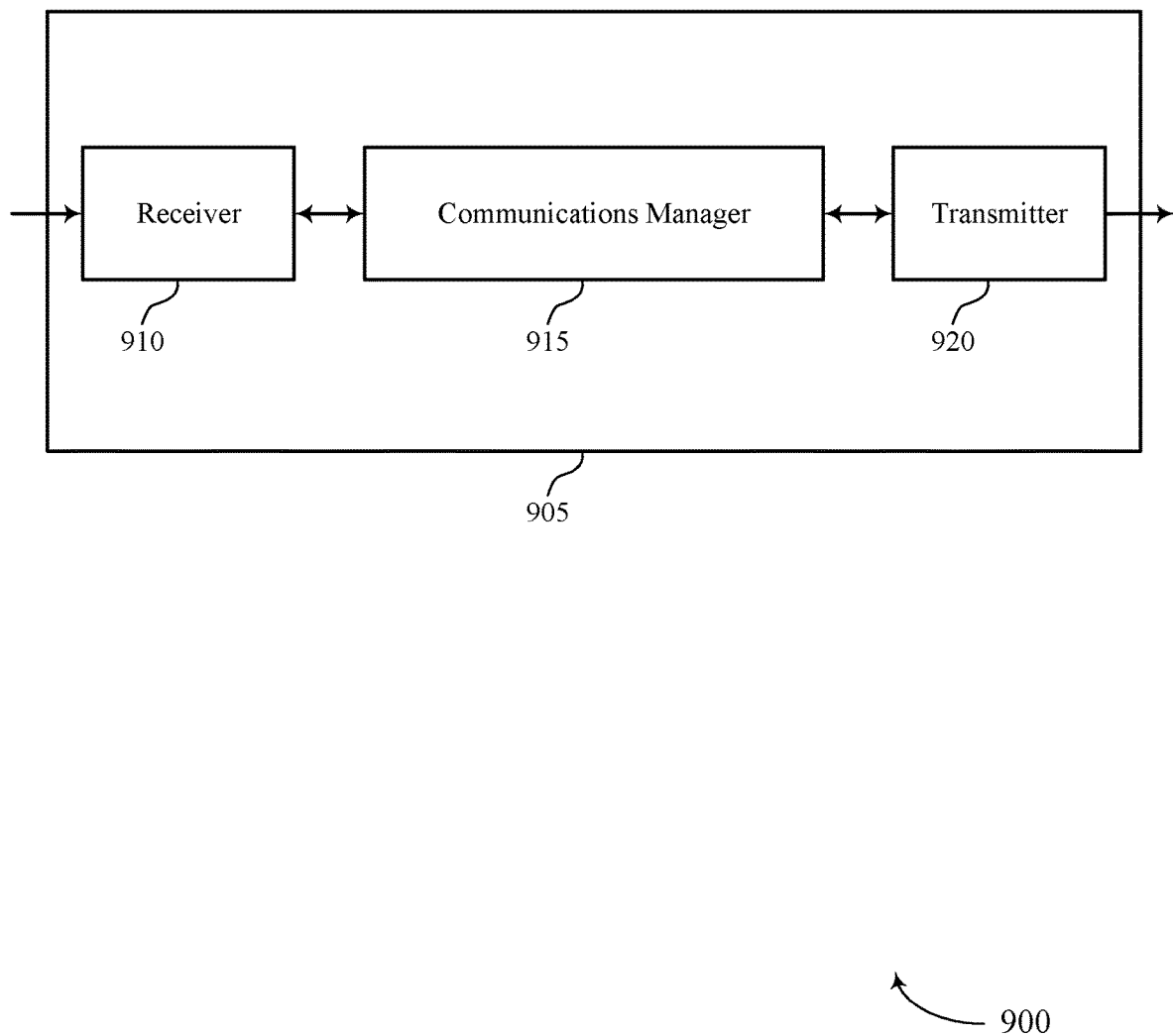
FIGS. 9 and 10 show block diagrams of devices that support BWP configuration switching for multiple transceiver nodes in accordance with aspects of the present disclosure.

FIG. 9 shows a block diagram 900 of a device 905 that supports BWP configuration switching for multiple transceiver nodes in accordance with aspects of the present disclosure. The device 905 may be an example of aspects of a UE 115 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to BWP configuration switching for multiple transceiver nodes, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may identify a transceiver node cluster including a set of transceiver nodes configured for communication with the UE, receive a control message from a first transceiver node of the set of transceiver nodes, and switch from a first BWP configuration for the first transceiver node to a second BWP configuration for the first transceiver node based on the control message. The communications manager 915 may be an example of aspects of the communications manager 1210 described herein. By performing the methods as described herein, communications manager 915 may enable a UE to successfully switch between BWP configurations when communicating with multiple transceiver nodes.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
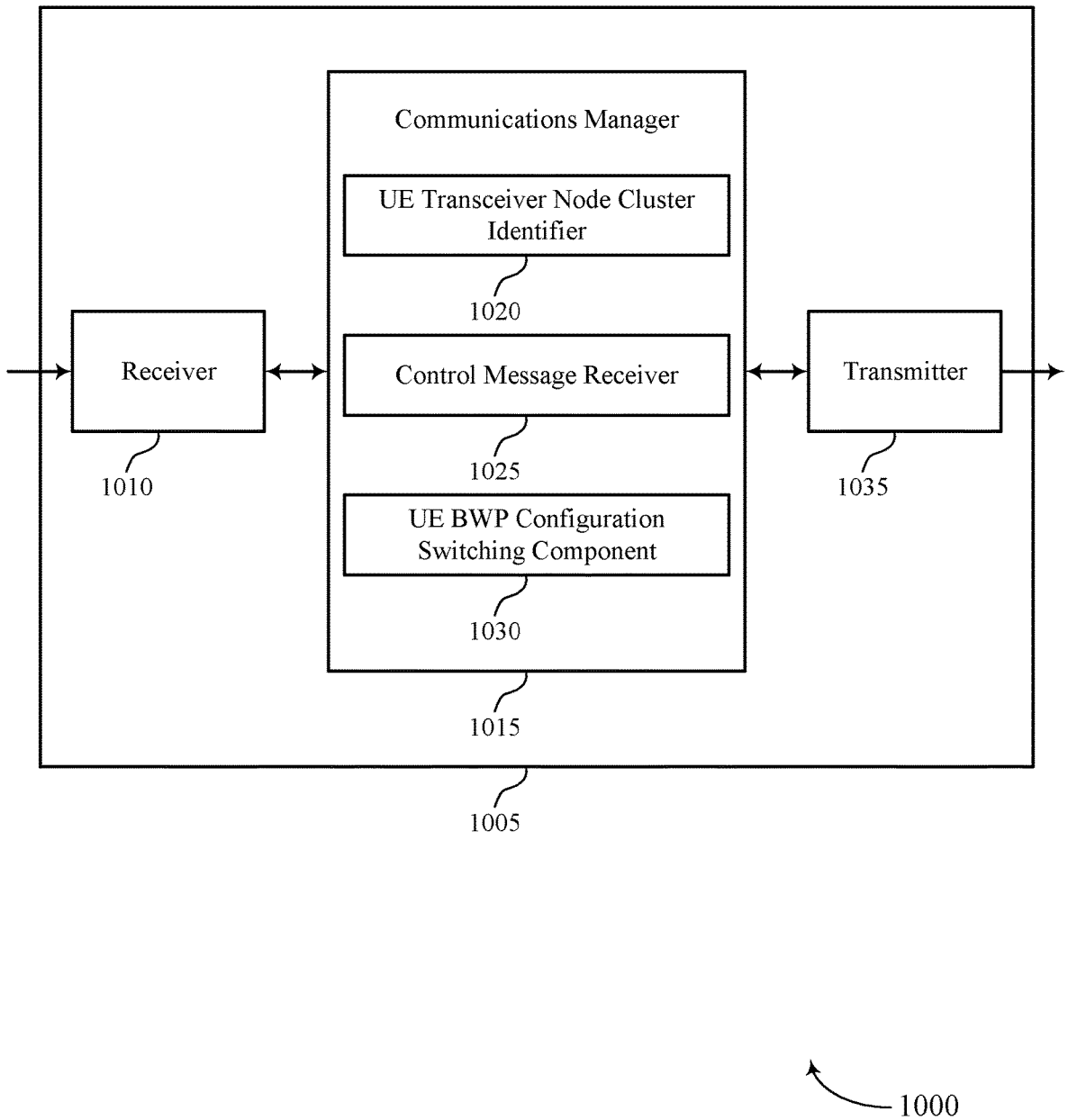

FIG. 10 shows a block diagram 1000 of a device 1005 that supports BWP configuration switching for multiple transceiver nodes in accordance with aspects of the present disclosure. The device 1005 may be an example of aspects of a device 905, or a UE 115 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to BWP configuration switching for multiple transceiver nodes, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include an UE transceiver node cluster identifier 1020, a control message receiver 1025, and an UE BWP configuration switching component 1030. The communications manager 1015 may be an example of aspects of the communications manager 1210 described herein.

The UE transceiver node cluster identifier 1020 may identify a transceiver node cluster including a set of transceiver nodes configured for communication with the UE.

The control message receiver 1025 may receive a control message from a first transceiver node of the set of transceiver nodes.

The UE BWP configuration switching component 1030 may switch from a first BWP configuration for the first transceiver node to a second BWP configuration for the first transceiver node based on the control message.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
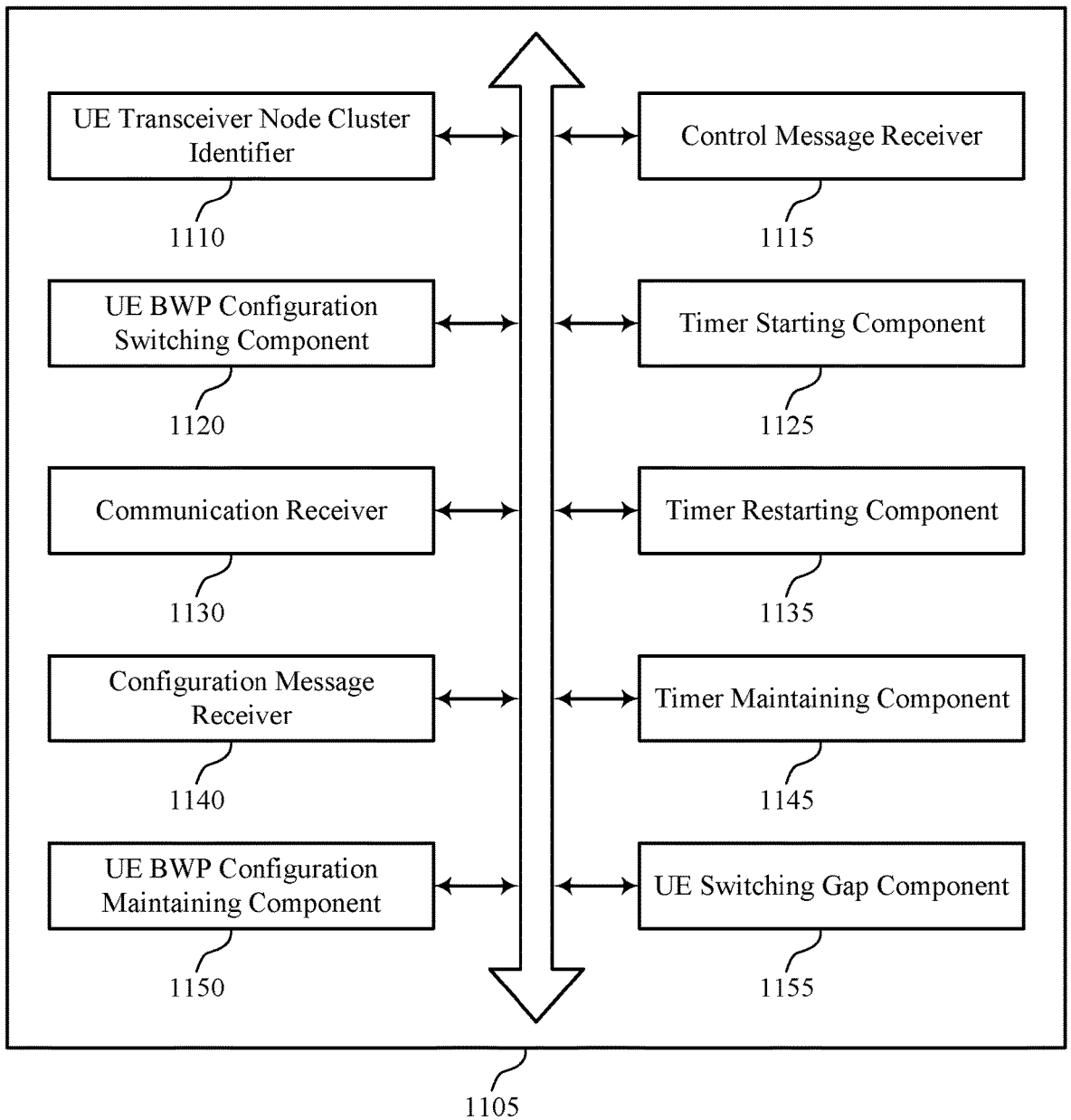
FIG. 11 shows a block diagram of a communications manager that supports BWP configuration switching for multiple transceiver nodes in accordance with aspects of the present disclosure.

FIG. 11 shows a block diagram 1100 of a communications manager 1105 that supports BWP configuration switching for multiple transceiver nodes in accordance with aspects of the present disclosure. The communications manager 1105 may be an example of aspects of a communications manager 915, a communications manager 1015, or a communications manager 1210 described herein. The communications manager 1105 may include an UE transceiver node cluster identifier 1110, a control message receiver 1115, an UE BWP configuration switching component 1120, a timer starting component 1125, a communication receiver 1130, a timer restarting component 1135, a configuration message receiver 1140, a timer maintaining component 1145, an UE BWP configuration maintaining component 1150, and an UE switching gap component 1155. Each of these modules may communicate, directly or indirectly, with one another (e.g., via one or more buses).

The UE transceiver node cluster identifier 1110 may identify a transceiver node cluster including a set of transceiver nodes configured for communication with the UE.

The control message receiver 1115 may receive a control message from a first transceiver node of the set of transceiver nodes. In some examples, the control message receiver 1115 may receive a second control message from the second transceiver node. In some cases, the control message includes a DCI message.

The UE BWP configuration switching component 1120 may switch from a first BWP configuration for the first transceiver node to a second BWP configuration for the first transceiver node based on the control message. In some examples, the UE BWP configuration switching component 1120 may switch from a first BWP configuration for a second transceiver node of the set of transceiver nodes to a second BWP configuration for the second transceiver node based on the control message. In some examples, the UE BWP configuration switching component 1120 may receive a configuration message that identifies at least the first transceiver node as a master transceiver node. In some examples, the UE BWP configuration switching component 1120 may switch from the second BWP configuration for the first transceiver node to a third BWP configuration for the first transceiver node upon expiration of the common timer for the set of transceiver nodes. In some examples, the UE BWP configuration switching component 1120 may switch from a first BWP configuration for a second transceiver node of the set of transceiver nodes to a second BWP configuration for the second transceiver node upon expiration of the common timer for the set of transceiver nodes. In some examples, the UE BWP configuration switching component 1120 may switch from the second BWP configuration for the first transceiver node to a third BWP configuration for the first transceiver node upon expiration of the common timer for the subset of the set of transceiver nodes. In some examples, the UE BWP configuration switching component 1120 may switch from a first BWP configuration for a transceiver node of the subset of the set of transceiver nodes to a second BWP configuration for the transceiver node of the subset of the set of transceiver nodes upon expiration of the common timer for the subset of the set of transceiver nodes. In some examples, the UE BWP configuration switching component 1120 may switch from the second BWP configuration for the first transceiver node to a third BWP configuration for the first transceiver node upon expiration of a first expiring timer of the set of separate timers. In some examples, the UE BWP configuration switching component 1120 may switch from a first BWP configuration for a second transceiver node of the set of transceiver nodes to a second BWP configuration for the second transceiver node upon expiration of the first expiring timer of the set of separate timers. In some examples, the UE BWP configuration switching component 1120 may switch from the first BWP configuration for the second transceiver node to a second BWP configuration for the second transceiver node.

In some cases, the first BWP configuration for the first transceiver node spans a same radio frequency bandwidth as the first BWP configuration for the second transceiver node, and where the second BWP configuration for the first transceiver node spans a same radio frequency bandwidth as the second BWP configuration for the second transceiver node. In some cases, the switching from the first BWP configuration for the second transceiver node to the second BWP configuration for the second transceiver node is further based on the first transceiver node being identified as the master transceiver node. In some cases, the third BWP configuration for the first transceiver node and the second BWP configuration for the second transceiver node include default BWP configurations. In some cases, the third BWP configuration for the first transceiver node and the second BWP configuration for the transceiver node of the subset of the set of transceiver nodes include default BWP configurations.

The timer starting component 1125 may start a common timer for the set of transceiver nodes based on switching from the first BWP configuration for the first transceiver node to the second BWP configuration for the first transceiver node. In some examples, the timer starting component 1125 may start a common timer for the subset of the set of transceiver nodes based on switching from the first BWP configuration for the first transceiver node to the second BWP configuration for the first transceiver node. In some examples, the timer starting component 1125 may start a set of separate timers for each of the set of transceiver nodes based on switching from the first BWP configuration for the first transceiver node to the second BWP configuration for the first transceiver node. In some examples, the timer starting component 1125 may start a first timer for the first transceiver node based on switching from the first BWP configuration for the first transceiver node to the second BWP configuration for the first transceiver node. In some examples, the timer starting component 1125 may start a second timer for the second transceiver node based on switching from the first BWP configuration for the second transceiver node to the second BWP configuration for the second transceiver node.

The communication receiver 1130 may receive a communication from any of the set of transceiver nodes. In some examples, the communication receiver 1130 may receive a communication from a transceiver node of the subset of the set of transceiver nodes. In some examples, the communication receiver 1130 may receive a communication from a transceiver node of the set of transceiver nodes that is outside the subset of the set of transceiver nodes. In some examples, the communication receiver 1130 may receive a communication from the first transceiver node.

The timer restarting component 1135 may restart the common timer for the set of transceiver nodes based on receiving the communication from any of the set of transceiver nodes. In some examples, the timer restarting component 1135 may restart the common timer for the subset of the set of transceiver nodes based on receiving the communication from the transceiver node of the subset of the set of transceiver nodes. In some examples, the timer restarting component 1135 may restart a separate timer at the first transceiver node based on receiving the communication from the first transceiver node.

The configuration message receiver 1140 may receive a configuration message that identifies a subset of the set of transceiver nodes as master transceiver nodes.

The timer maintaining component 1145 may maintain the common timer for the subset of the set of transceiver nodes after receiving the communication from the transceiver node that is outside the subset of the set of transceiver nodes. In some examples, the timer maintaining component 1145 may maintain the first timer after switching from the first BWP configuration for the second transceiver node to the second BWP configuration for the second transceiver node.

The UE BWP configuration maintaining component 1150 may maintain a first BWP configuration for a second transceiver node of the set of transceiver nodes after switching from the first BWP configuration for the first transceiver node to the second BWP configuration for the first transceiver node. In some cases, the first BWP configuration for the first transceiver node and a first BWP configuration for a second transceiver node of the set of transceiver nodes share a same center frequency.

The UE switching gap component 1155 may identify a switching gap associated with switching from the first BWP configuration for the first transceiver node to the second BWP configuration for the first transceiver node. In some examples, the UE switching gap component 1155 may refrain from communicating with each transceiver node of the set of transceiver nodes during the switching gap.

Figure 12:
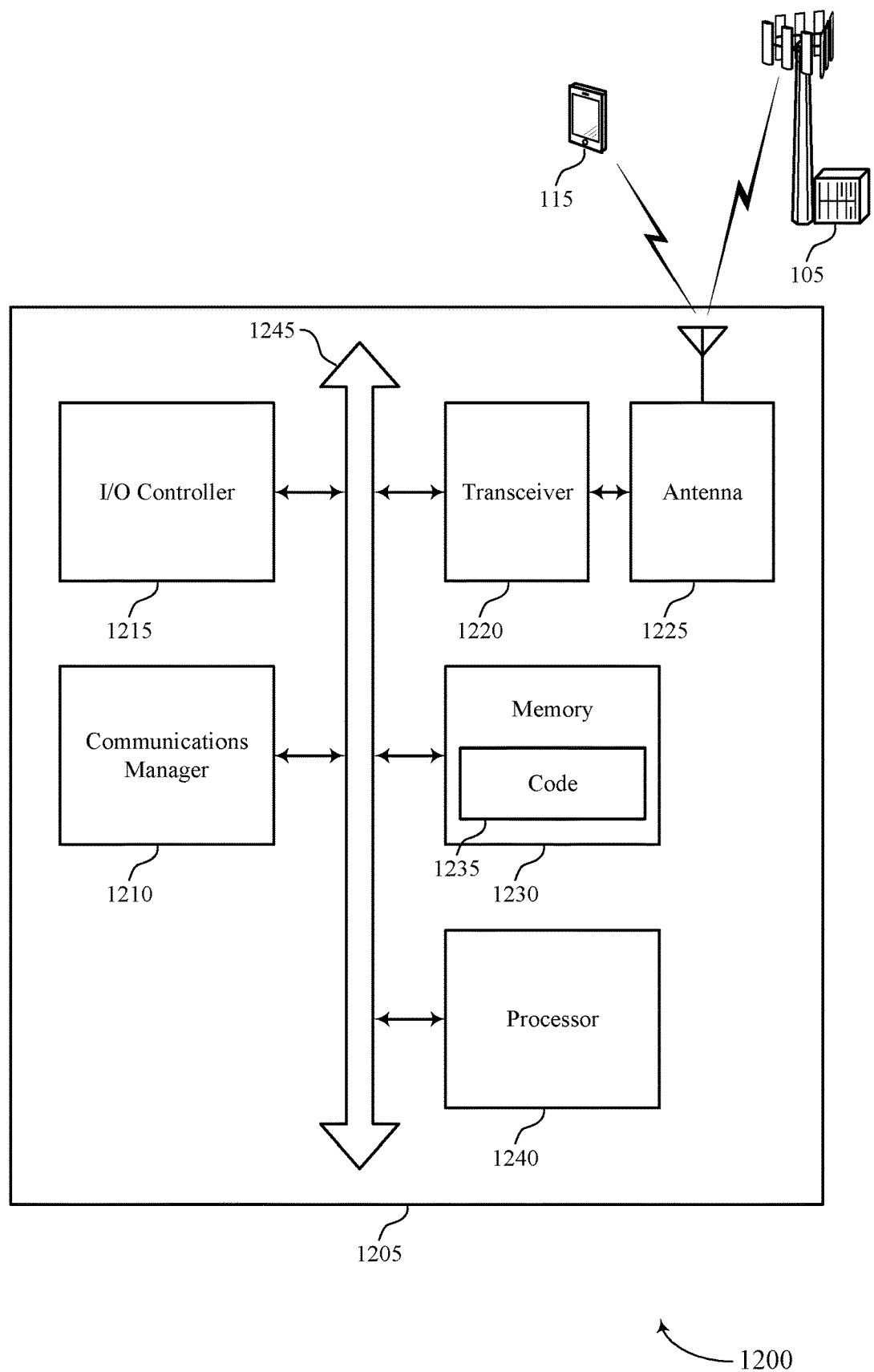
FIG. 12 shows a diagram of a system including a device that supports BWP configuration switching for multiple transceiver nodes in accordance with aspects of the present disclosure.

FIG. 12 shows a diagram of a system 1200 including a device 1205 that supports BWP configuration switching for multiple transceiver nodes in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (e.g., bus 1245).

The communications manager 1210 may identify a transceiver node cluster including a set of transceiver nodes configured for communication with the UE, receive a control message from a first transceiver node of the set of transceiver nodes, and switch from a first BWP configuration for the first transceiver node to a second BWP configuration for the first transceiver node based on the control message.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include random-access memory (RAM) and read-only memory (ROM). The memory 1230 may store computer-readable, computer-executable code 1235 including instructions that, when executed, cause the processor to perform various functions described herein. In some cases, the memory 1230 may contain, among other things, a basic input/output system (BIOS) which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting BWP configuration switching for multiple transceiver nodes).

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
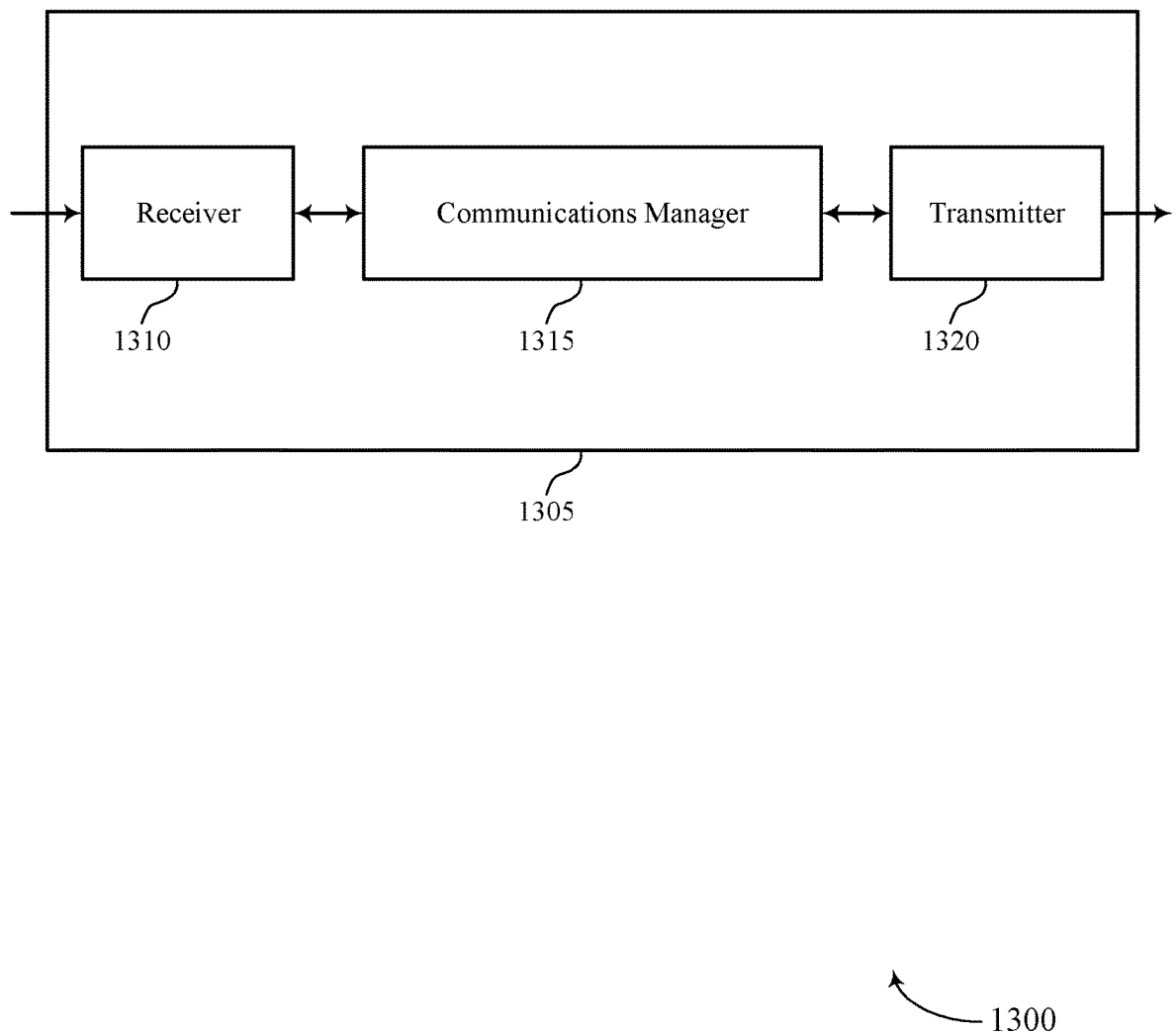
FIGS. 13 and 14 show block diagrams of devices that support BWP configuration switching for multiple transceiver nodes in accordance with aspects of the present disclosure.

FIG. 13 shows a block diagram 1300 of a device 1305 that supports BWP configuration switching for multiple transceiver nodes in accordance with aspects of the present disclosure. The device 1305 may be an example of aspects of a transceiver node cluster 205 or base station 105 as described herein. The device 1305 may include a receiver 1310, a communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to BWP configuration switching for multiple transceiver nodes, etc.). Information may be passed on to other components of the device 1305. The receiver 1310 may be an example of aspects of the transceiver 1620 described with reference to FIG. 16. The receiver 1310 may utilize a single antenna or a set of antennas.

The communications manager 1315 may identify a transceiver node cluster including a set of transceiver nodes configured for communication with a UE, transmit, from a first transceiver node of the set of transceiver nodes, a control message, and switch from a first BWP configuration for the first transceiver node to a second BWP configuration for the first transceiver node after transmitting the control message. The communications manager 1315 may be an example of aspects of the communications manager 1610 described herein. By performing the methods as described herein, communications manager 1610 may enable transceiver nodes of a transceiver node cluster to successfully switch between BWP configurations when communicating with a UE.

The communications manager 1315, or its sub-components, may be implemented in hardware, code (e.g., software or firmware) executed by a processor, or any combination thereof. If implemented in code executed by a processor, the functions of the communications manager 1315, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with various aspects of the present disclosure. In some examples, the communications manager 1315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
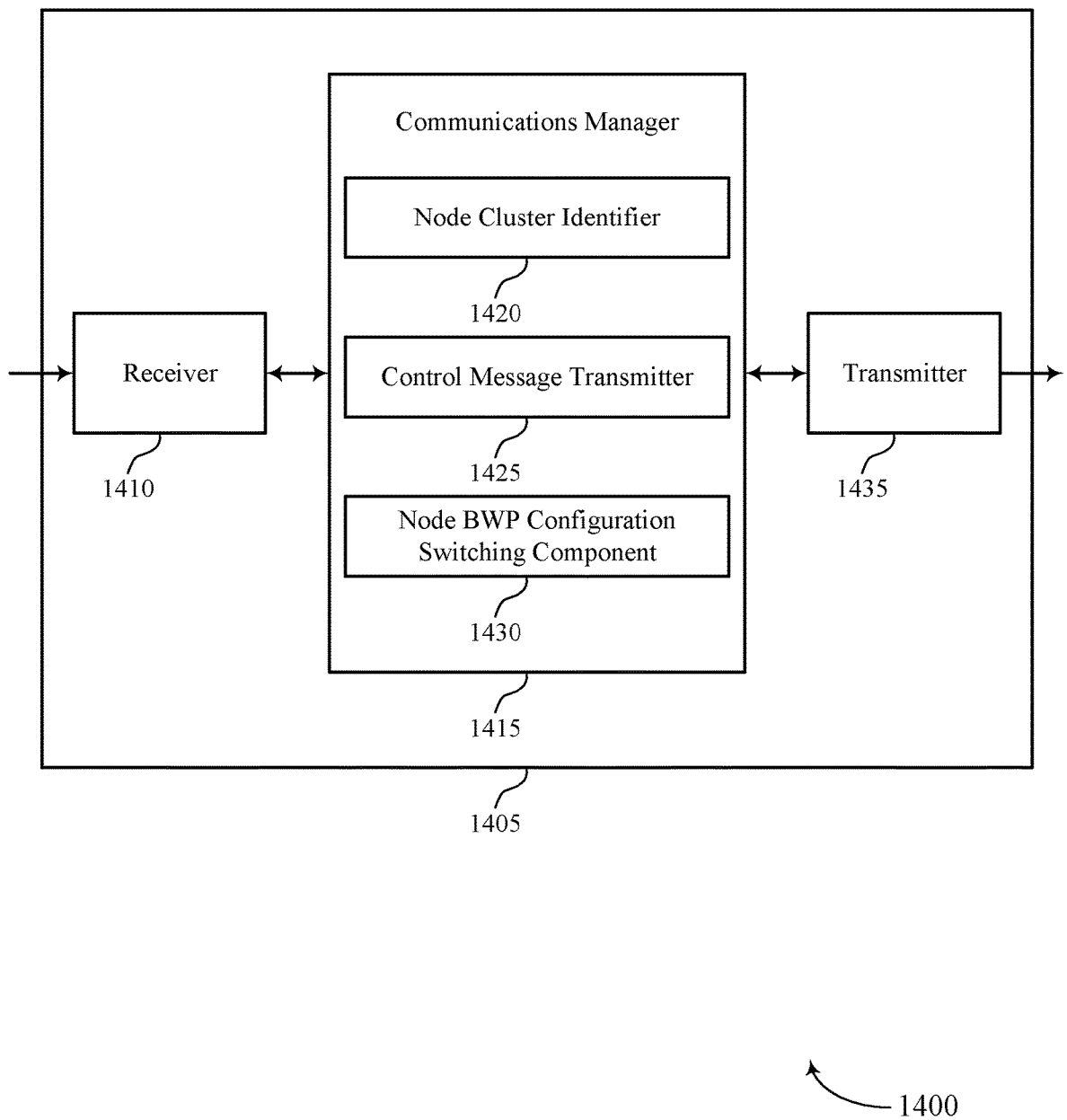

FIG. 14 shows a block diagram 1400 of a device 1405 that supports BWP configuration switching for multiple transceiver nodes in accordance with aspects of the present disclosure. The device 1405 may be an example of aspects of a device 1305, a transceiver node cluster 205, or a base station 105 as described herein. The device 1405 may include a receiver 1410, a communications manager 1415, and a transmitter 1435. The device 1405 may also include a processor. Each of these components may be in communication with one another (e.g., via one or more buses).

The receiver 1410 may receive information such as packets, user data, or control information associated with various information channels (e.g., control channels, data channels, and information related to BWP configuration switching for multiple transceiver nodes, etc.). Information may be passed on to other components of the device 1405. The receiver 1410 may be an example of aspects of the transceiver 1620 described with reference to FIG. 16. The receiver 1410 may utilize a single antenna or a set of antennas.

The communications manager 1415 may be an example of aspects of the communications manager 1315 as described herein. The communications manager 1415 may include a node cluster identifier 1420, a control message transmitter 1425, and a node BWP configuration switching component 1430. The communications manager 1415 may be an example of aspects of the communications manager 1610 described herein.

The node cluster identifier 1420 may identify a transceiver node cluster including a set of transceiver nodes configured for communication with a UE.

The control message transmitter 1425 may transmit, from a first transceiver node of the set of transceiver nodes, a control message.

The node BWP configuration switching component 1430 may switch from a first BWP configuration for the first transceiver node to a second BWP configuration for the first transceiver node after transmitting the control message.

The transmitter 1435 may transmit signals generated by other components of the device 1405. In some examples, the transmitter 1435 may be collocated with a receiver 1410 in a transceiver module. For example, the transmitter 1435 may be an example of aspects of the transceiver 1620 described with reference to FIG. 16. The transmitter 1435 may utilize a single antenna or a set of antennas.

Figure 15:
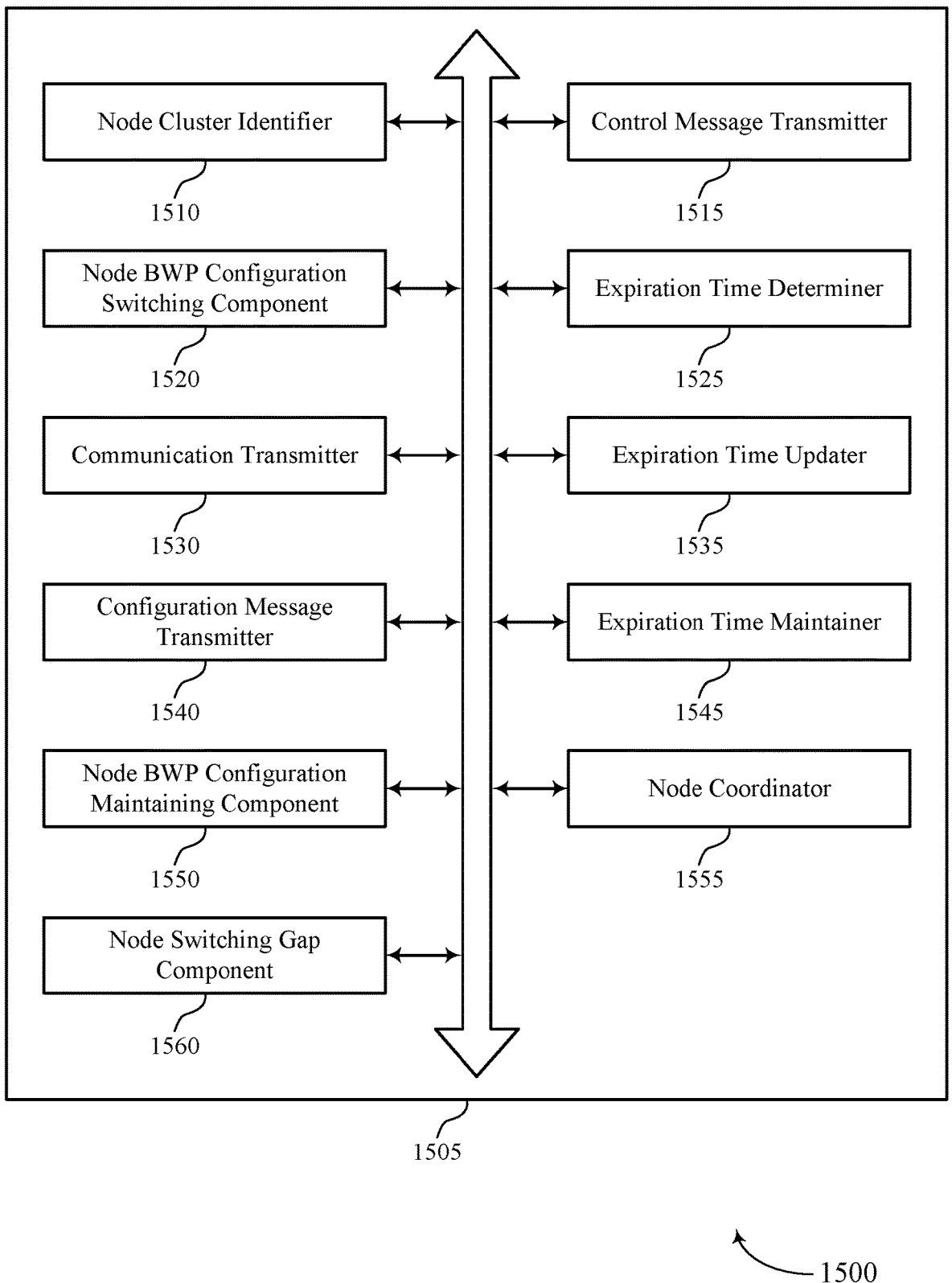
FIG. 15 shows a block diagram of a communications manager that supports BWP configuration switching for multiple transceiver nodes in accordance with aspects of the present disclosure.

FIG. 15 shows a block diagram 1500 of a communications manager 1505 that supports BWP configuration switching for multiple transceiver nodes in accordance with aspects of the present disclosure. The communications manager 1505 may be an example of aspects of a communications manager 1315, a communications manager 1415, or a communications manager 1610 described herein. The communications manager 1505 may include a node cluster identifier 1510, a control message transmitter 1515, a node BWP configuration switching component 1520, an expiration time determiner 1525, a communication transmitter 1530, an expiration time updater 1535, a configuration message transmitter 1540, an expiration time maintainer 1545, a node BWP configuration maintaining component 1550, a node coordinator 1555, and a node switching gap component 1560. Each of these modules may communicate, directly or indirectly, with one another (e.g., via one or more buses).

The node cluster identifier 1510 may identify a transceiver node cluster including a set of transceiver nodes configured for communication with a UE.

The control message transmitter 1515 may transmit, from a first transceiver node of the set of transceiver nodes, a control message. In some examples, the control message transmitter 1515 may transmit a second control message from the second transceiver node. In some cases, the control message includes a DCI message.

The node BWP configuration switching component 1520 may switch from a first BWP configuration for the first transceiver node to a second BWP configuration for the first transceiver node after transmitting the control message. In some examples, the node BWP configuration switching component 1520 may switch from a first set of BWP configurations for each transceiver node of the set of transceiver nodes to a second set of BWP configurations for each transceiver node of the set of transceiver nodes after transmitting the control message. In some examples, the node BWP configuration switching component 1520 may transmit a configuration message that identifies at least the first transceiver node as a master transceiver node, where switching from the first set of BWP configurations for each transceiver node of the set of transceiver nodes to the second set of BWP configurations for each transceiver node of the set of transceiver nodes is based on the first transceiver node being the master transceiver node. In some examples, the node BWP configuration switching component 1520 may switch from the second BWP configuration for the first transceiver node to a third BWP configuration for the first transceiver node upon reaching the determined expiration time. In some examples, the node BWP configuration switching component 1520 may switch from a first BWP configuration for a second transceiver node of the set of transceiver nodes to a second BWP configuration for the second transceiver node upon reaching the determined expiration time. In some examples, the node BWP configuration switching component 1520 may switch from a first BWP configuration for a transceiver of the subset of the set of transceiver nodes to a second BWP configuration for the transceiver of the subset of the set of transceiver nodes upon reaching the determined expiration time. In some examples, the node BWP configuration switching component 1520 may switch from the second BWP configuration for the first transceiver node to a third BWP configuration for the first transceiver node upon reaching a first expiration time of the set of expiration times. In some examples, the node BWP configuration switching component 1520 may switch from a first BWP configuration for a second transceiver of the set of transceiver nodes to a second BWP configuration for the second transceiver upon reaching the determined expiration time. In some examples, the node BWP configuration switching component 1520 may switch from the first BWP configuration for the second transceiver node to a second BWP configuration for the second transceiver node. In some cases, each of the first set of BWP configurations for each transceiver node of the set of transceiver nodes spans a same radio frequency bandwidth and where each of the second set of BWP configurations for each transceiver node of the set of transceiver nodes spans a same frequency radio frequency bandwidth. In some cases, the third BWP configuration for the first transceiver node and the second BWP configuration for the second transceiver node include default BWP configurations. In some cases, the third BWP configuration for the first transceiver node and the second BWP configuration for transceiver of the subset of the set of transceiver nodes include default BWP configurations.

The expiration time determiner 1525 may determine an expiration time of a common timer for the set of transceiver nodes based on switching from the first BWP configuration for the first transceiver node to the second BWP configuration for the first transceiver node. In some examples, the expiration time determiner 1525 may determine an expiration time for a common timer for the subset of the set of transceiver nodes based on switching from the first BWP configuration for the first transceiver node to the second BWP configuration for the first transceiver node. In some examples, the expiration time determiner 1525 may determine a set of expiration times for each of the set of transceiver nodes based on switching from the first BWP configuration for the first transceiver node to the second BWP configuration for the first transceiver node. In some examples, the expiration time determiner 1525 may determine a first expiration time at the first transceiver node based on switching from the first BWP configuration for the first transceiver node to the second BWP configuration for the first transceiver node. In some examples, the expiration time determiner 1525 may determine a second expiration time at the second transceiver node based on switching from the first BWP configuration for the second transceiver node to the second BWP configuration for the second transceiver node.

The communication transmitter 1530 may transmit a communication from any of the set of transceiver nodes. In some examples, the communication transmitter 1530 may transmit a communication from a transceiver node of the subset of the set of transceiver nodes. In some examples, the communication transmitter 1530 may transmit a communication from a transceiver node of the set of transceiver nodes that is outside the subset of the set of transceiver nodes. In some examples, the communication transmitter 1530 may transmit a communication from a transceiver node of the set of transceiver nodes.

The expiration time updater 1535 may update the expiration time based on transmitting the communication from any of the set of transceiver nodes. In some examples, the expiration time updater 1535 may update the expiration time based on transmitting the communication from the transceiver node of the subset of the set of transceiver nodes. In some examples, the expiration time updater 1535 may update an expiration time for the transceiver node of the set of transceiver nodes based on transmitting the communication.

The configuration message transmitter 1540 may transmit a configuration message that identifies a subset of the set of transceiver nodes as master transceiver nodes.

The expiration time maintainer 1545 may refrain from updating the expiration time based on transmitting the communication from the transceiver node of the set of transceiver nodes that is outside the subset of the set of transceiver nodes. In some examples, the expiration time maintainer 1545 may refrain from updating the first expiration time after switching from the first BWP configuration for the second transceiver node to the second BWP configuration for the second transceiver node.

The node BWP configuration maintaining component 1550 may maintain a first BWP configuration for a second transceiver node of the set of transceiver nodes after switching from the first BWP configuration for the first transceiver node to the second BWP configuration for the first transceiver node. In some cases, the first BWP configuration for the first transceiver node and a first BWP configuration for a second transceiver node of the set of transceiver nodes share a same center frequency.

The node coordinator 1555 may coordinate, among the plurality of transceiver nodes, a first switching gap for the plurality of transceiver nodes, where the first switching gap is associated with switching from the first bandwidth part configuration for the first transceiver node to the second bandwidth part configuration for the first transceiver node. The node coordinator 1555 may coordinate, among the plurality of transceiver nodes, a second switching gap for the plurality of transceiver nodes, where the second switching gap is associated with switching from a first bandwidth part configuration for the second transceiver node to a second bandwidth part configuration for the second transceiver node, and where the second switching gap spans a same time duration as the first switching gap. The node coordinator 1555 may coordinate, among the plurality of transceiver nodes, a common center frequency for the second bandwidth part configuration for the first transceiver node and the second bandwidth part configuration for the second transceiver node.

The node switching gap component 1560 may identify a switching gap associated with switching from the first BWP configuration for the first transceiver node to the second BWP configuration for the first transceiver node. In some examples, the node switching gap component 1560 may refrain from communicating with the UE during the switching gap.

Figure 16:
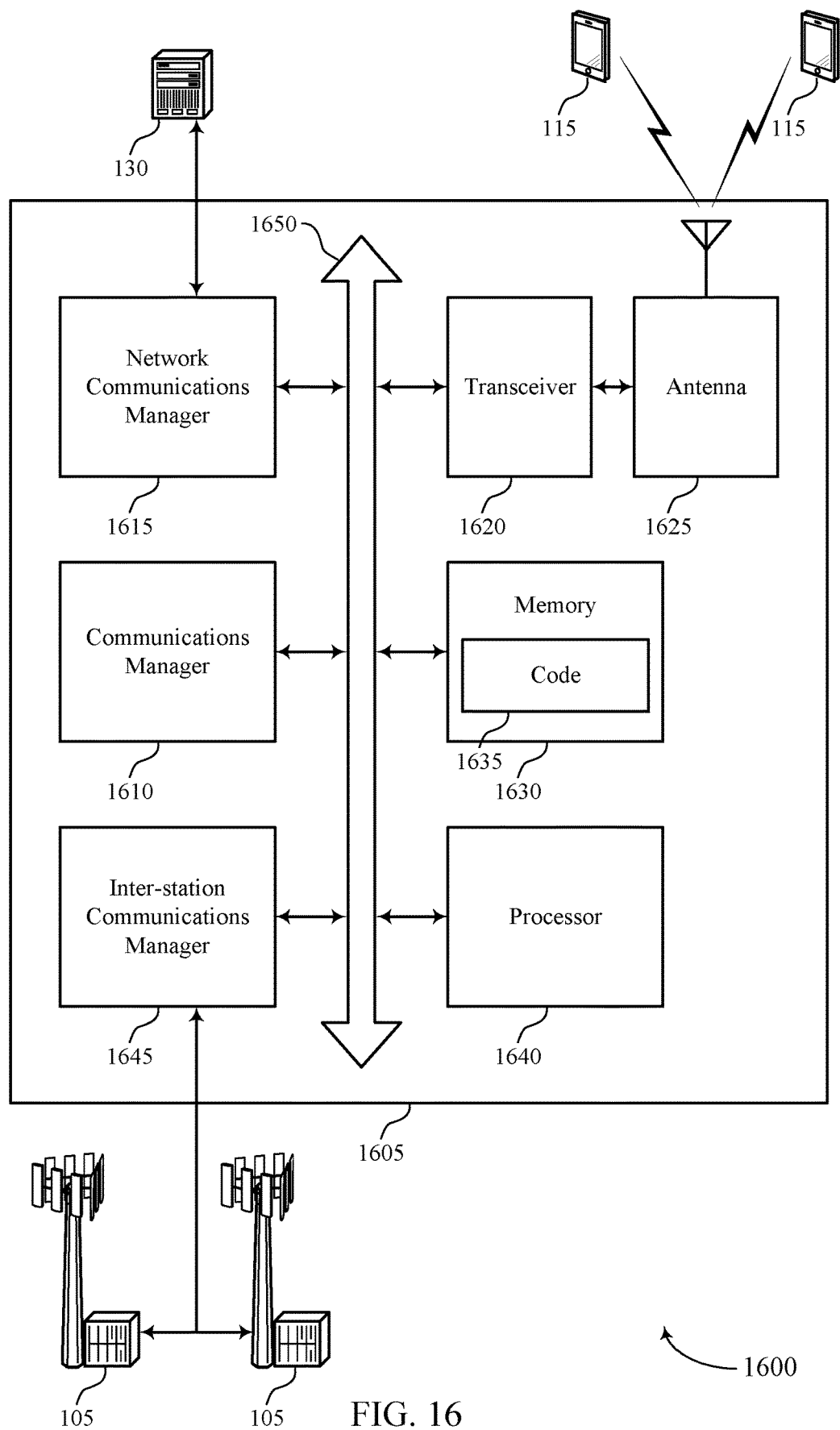
FIG. 16 shows a diagram of a system including a device that supports BWP configuration switching for multiple transceiver nodes in accordance with aspects of the present disclosure.

FIG. 16 shows a diagram of a system 1600 including a device 1605 that supports BWP configuration switching for multiple transceiver nodes in accordance with aspects of the present disclosure. The device 1605 may be an example of or include the components of device 1305, device 1405, a transceiver node cluster 205, or a base station 105 as described herein. The device 1605 may include components for bi-directional voice and data communications including components for transmitting and receiving communications, including a communications manager 1610, a network communications manager 1615, a transceiver 1620, an antenna 1625, memory 1630, a processor 1640, and an inter-station communications manager 1645. These components may be in electronic communication via one or more buses (e.g., bus 1650).

The communications manager 1610 may identify a transceiver node cluster including a set of transceiver nodes configured for communication with a UE, transmit, from a first transceiver node of the set of transceiver nodes, a control message, and switch from a first BWP configuration for the first transceiver node to a second BWP configuration for the first transceiver node after transmitting the control message.

The network communications manager 1615 may manage communications with the core network (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In other cases, a memory controller may be integrated into processor 1640. The processor 1640 may be configured to execute computer-readable instructions stored in a memory (e.g., the memory 1630) to cause the device 1605 to perform various functions (e.g., functions or tasks supporting BWP configuration switching for multiple transceiver nodes).

The inter-station communications manager 1645 may manage communications with other base station 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
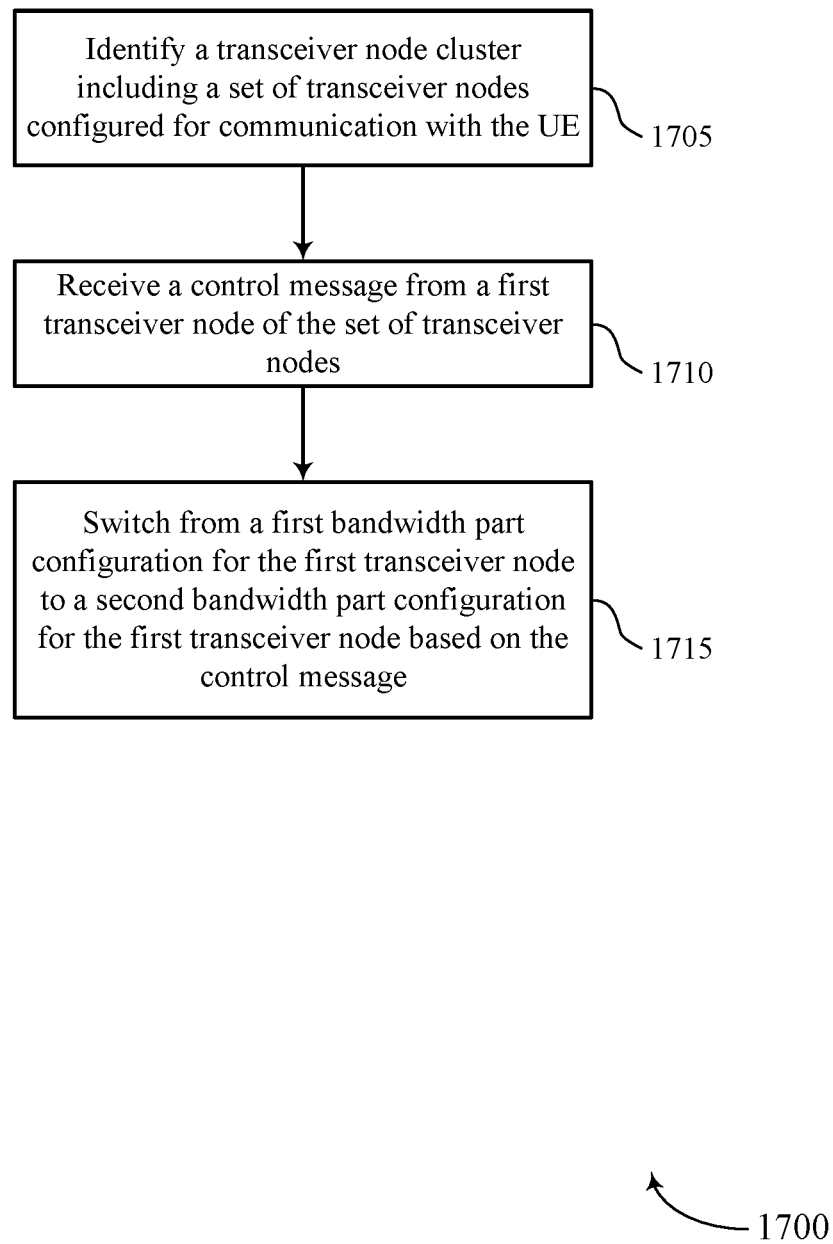
FIGS. 17 through 24 show flowcharts illustrating methods that support BWP configuration switching for multiple transceiver nodes in accordance with aspects of the present disclosure.

FIG. 17 shows a flowchart illustrating a method 1700 that supports BWP configuration switching for multiple transceiver nodes in accordance with aspects of the present disclosure. The operations of method 1700 may be implemented by a UE 115 or its components as described herein. For example, the operations of method 1700 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1705, the UE may identify a transceiver node cluster including a set of transceiver nodes configured for communication with the UE. The operations of 1705 may be performed according to the methods described herein. In some examples, aspects of the operations of 1705 may be performed by an UE transceiver node cluster identifier as described with reference to FIGS. 9 through 12.

At 1710, the UE may receive a control message from a first transceiver node of the set of transceiver nodes. The operations of 1710 may be performed according to the methods described herein. In some examples, aspects of the operations of 1710 may be performed by a control message receiver as described with reference to FIGS. 9 through 12.

At 1715, the UE may switch from a first BWP configuration for the first transceiver node to a second BWP configuration for the first transceiver node based on the control message. The operations of 1715 may be performed according to the methods described herein. In some examples, aspects of the operations of 1715 may be performed by an UE BWP configuration switching component as described with reference to FIGS. 9 through 12.

Figure 18:
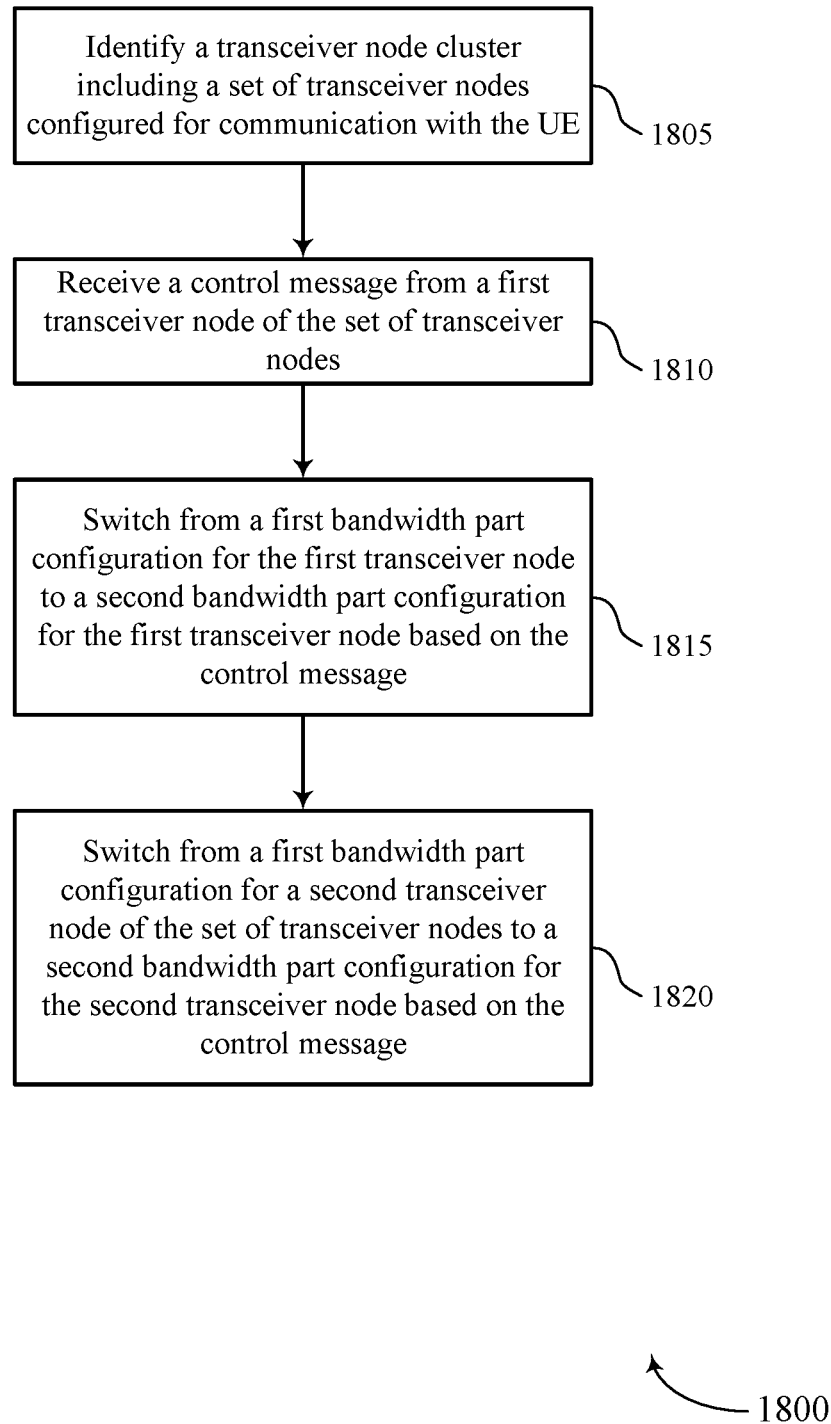

FIG. 18 shows a flowchart illustrating a method 1800 that supports BWP configuration switching for multiple transceiver nodes in accordance with aspects of the present disclosure. The operations of method 1800 may be implemented by a UE 115 or its components as described herein. For example, the operations of method 1800 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1805, the UE may identify a transceiver node cluster including a set of transceiver nodes configured for communication with the UE. The operations of 1805 may be performed according to the methods described herein. In some examples, aspects of the operations of 1805 may be performed by an UE transceiver node cluster identifier as described with reference to FIGS. 9 through 12.

At 1810, the UE may receive a control message from a first transceiver node of the set of transceiver nodes. The operations of 1810 may be performed according to the methods described herein. In some examples, aspects of the operations of 1810 may be performed by a control message receiver as described with reference to FIGS. 9 through 12.

At 1815, the UE may switch from a first BWP configuration for the first transceiver node to a second BWP configuration for the first transceiver node based on the control message. The operations of 1815 may be performed according to the methods described herein. In some examples, aspects of the operations of 1815 may be performed by an UE BWP configuration switching component as described with reference to FIGS. 9 through 12.

At 1820, the UE may switch from a first BWP configuration for a second transceiver node of the set of transceiver nodes to a second BWP configuration for the second transceiver node based on the control message. The operations of 1820 may be performed according to the methods described herein. In some examples, aspects of the operations of 1820 may be performed by an UE BWP configuration switching component as described with reference to FIGS. 9 through 12.

Figure 19:
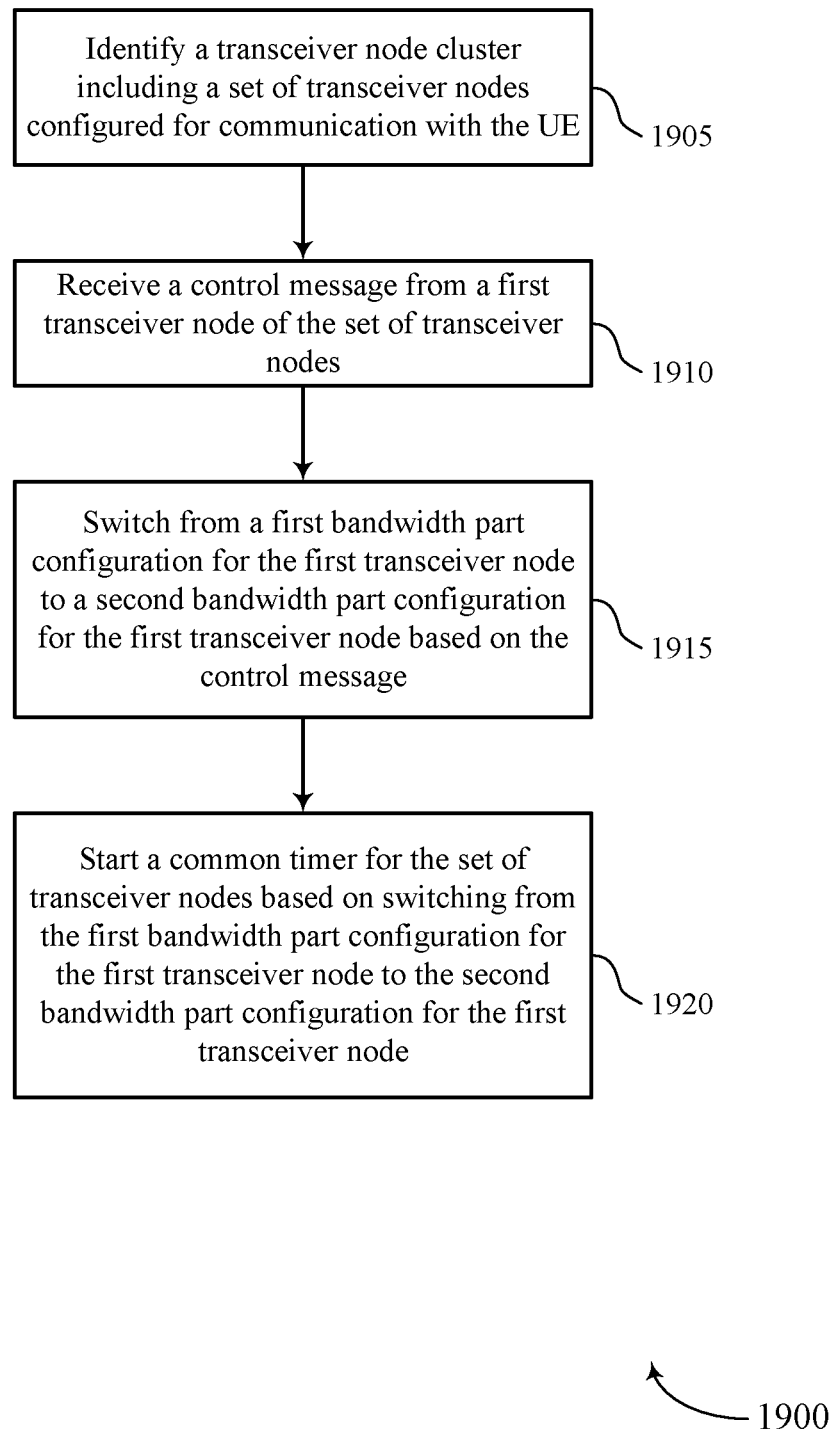

FIG. 19 shows a flowchart illustrating a method 1900 that supports BWP configuration switching for multiple transceiver nodes in accordance with aspects of the present disclosure. The operations of method 1900 may be implemented by a UE 115 or its components as described herein. For example, the operations of method 1900 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1905, the UE may identify a transceiver node cluster including a set of transceiver nodes configured for communication with the UE. The operations of 1905 may be performed according to the methods described herein. In some examples, aspects of the operations of 1905 may be performed by an UE transceiver node cluster identifier as described with reference to FIGS. 9 through 12.

At 1910, the UE may receive a control message from a first transceiver node of the set of transceiver nodes. The operations of 1910 may be performed according to the methods described herein. In some examples, aspects of the operations of 1910 may be performed by a control message receiver as described with reference to FIGS. 9 through 12.

At 1915, the UE may switch from a first BWP configuration for the first transceiver node to a second BWP configuration for the first transceiver node based on the control message. The operations of 1915 may be performed according to the methods described herein. In some examples, aspects of the operations of 1915 may be performed by an UE BWP configuration switching component as described with reference to FIGS. 9 through 12.

At 1920, the UE may start a common timer for the set of transceiver nodes based on switching from the first BWP configuration for the first transceiver node to the second BWP configuration for the first transceiver node. The operations of 1920 may be performed according to the methods described herein. In some examples, aspects of the operations of 1920 may be performed by a timer starting component as described with reference to FIGS. 9 through 12.

Figure 20:
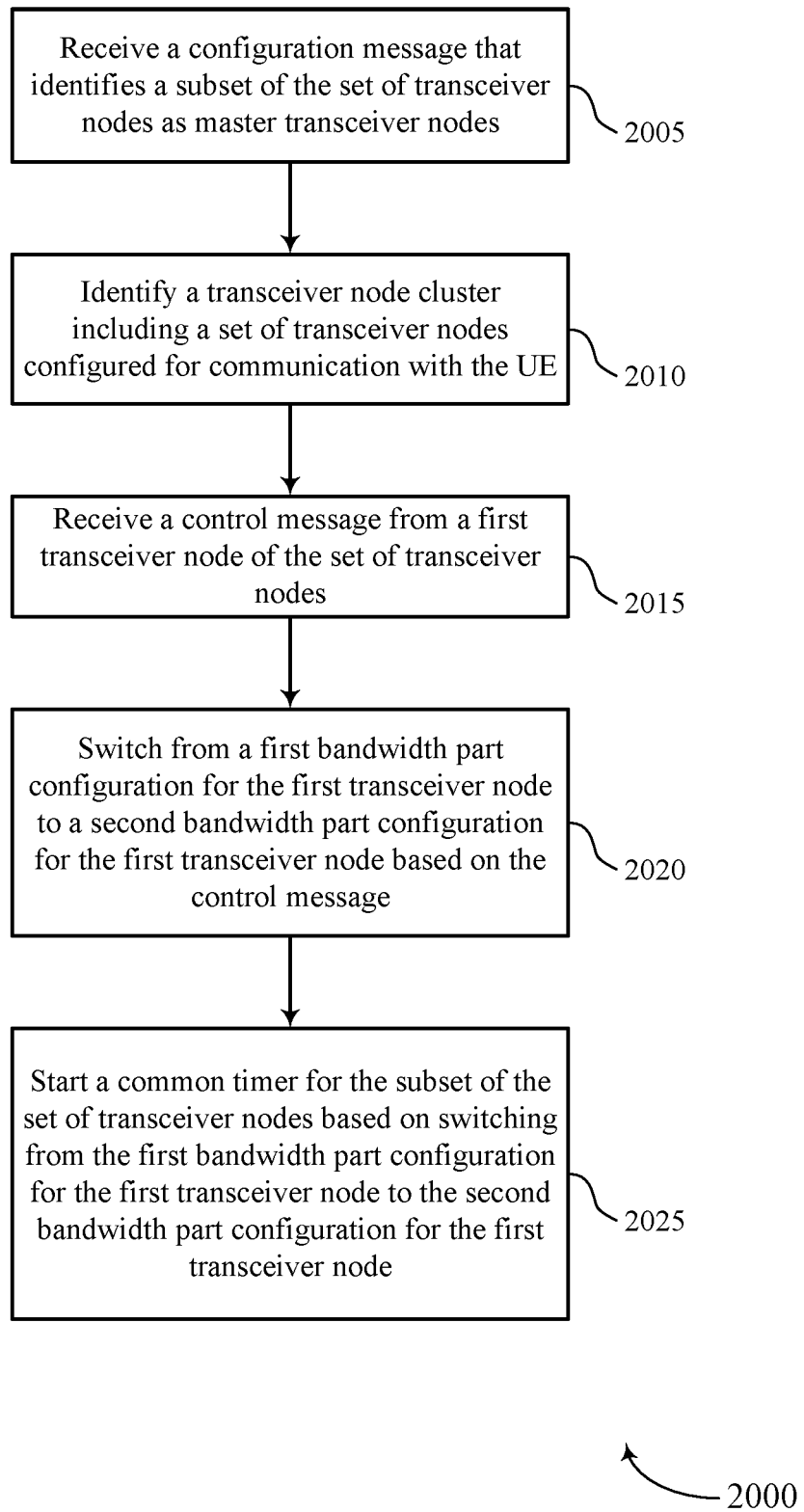

FIG. 20 shows a flowchart illustrating a method 2000 that supports BWP configuration switching for multiple transceiver nodes in accordance with aspects of the present disclosure. The operations of method 2000 may be implemented by a UE 115 or its components as described herein. For example, the operations of method 2000 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 2005, the UE may receive a configuration message that identifies a subset of the set of transceiver nodes as master transceiver nodes. The operations of 2005 may be performed according to the methods described herein. In some examples, aspects of the operations of 2005 may be performed by a configuration message receiver as described with reference to FIGS. 9 through 12.

At 2010, the UE may identify a transceiver node cluster including a set of transceiver nodes configured for communication with the UE. The operations of 2010 may be performed according to the methods described herein. In some examples, aspects of the operations of 2010 may be performed by an UE transceiver node cluster identifier as described with reference to FIGS. 9 through 12.

At 2015, the UE may receive a control message from a first transceiver node of the set of transceiver nodes. The operations of 2015 may be performed according to the methods described herein. In some examples, aspects of the operations of 2015 may be performed by a control message receiver as described with reference to FIGS. 9 through 12.

At 2020, the UE may switch from a first BWP configuration for the first transceiver node to a second BWP configuration for the first transceiver node based on the control message. The operations of 2020 may be performed according to the methods described herein. In some examples, aspects of the operations of 2020 may be performed by an UE BWP configuration switching component as described with reference to FIGS. 9 through 12.

At 2025, the UE may start a common timer for the subset of the set of transceiver nodes based on switching from the first BWP configuration for the first transceiver node to the second BWP configuration for the first transceiver node. The operations of 2025 may be performed according to the methods described herein. In some examples, aspects of the operations of 2025 may be performed by a timer starting component as described with reference to FIGS. 9 through 12.

Figure 21:
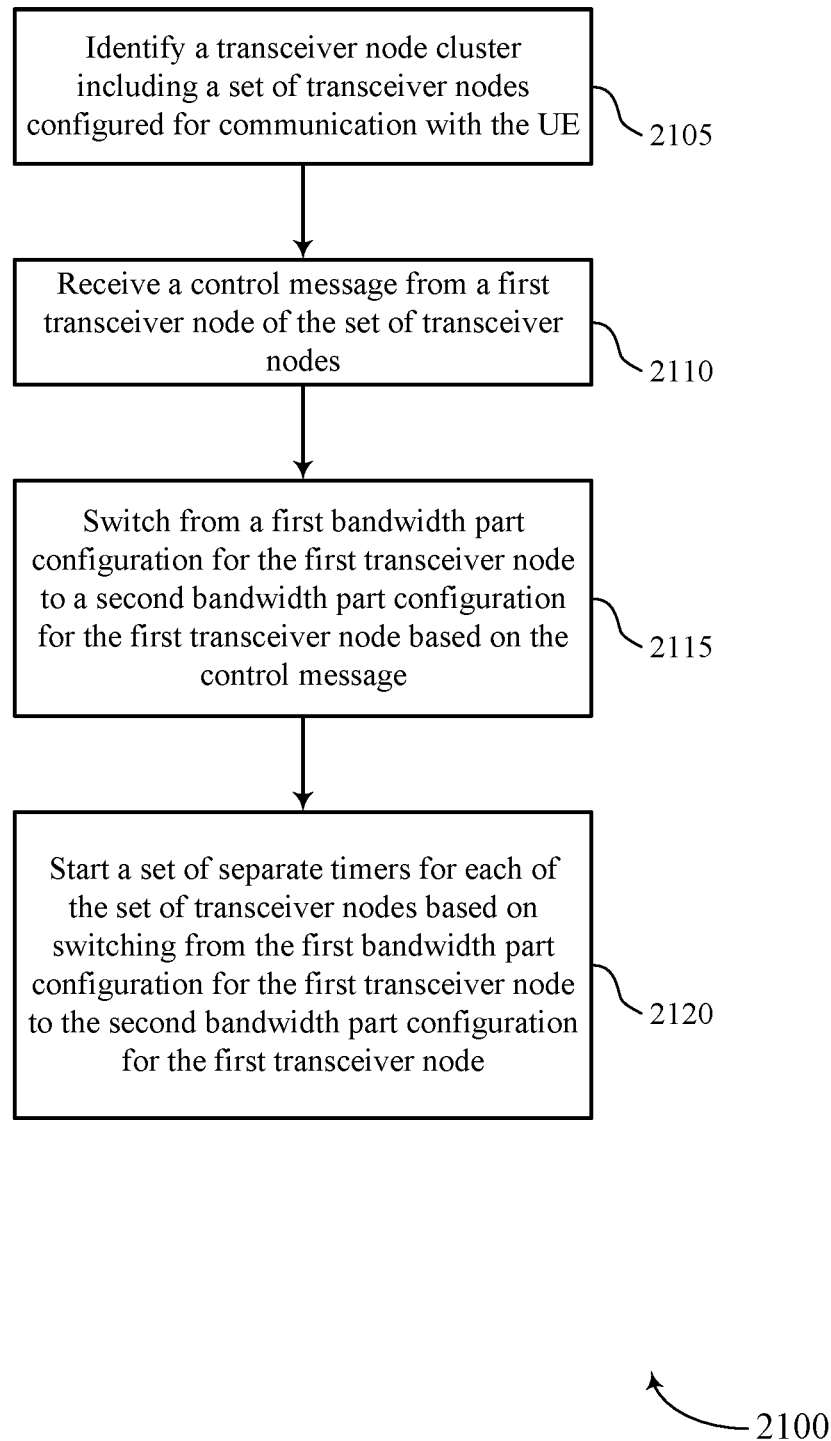

FIG. 21 shows a flowchart illustrating a method 2100 that supports BWP configuration switching for multiple transceiver nodes in accordance with aspects of the present disclosure. The operations of method 2100 may be implemented by a UE 115 or its components as described herein. For example, the operations of method 2100 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 2105, the UE may identify a transceiver node cluster including a set of transceiver nodes configured for communication with the UE. The operations of 2105 may be performed according to the methods described herein. In some examples, aspects of the operations of 2105 may be performed by an UE transceiver node cluster identifier as described with reference to FIGS. 9 through 12.

At 2110, the UE may receive a control message from a first transceiver node of the set of transceiver nodes. The operations of 2110 may be performed according to the methods described herein. In some examples, aspects of the operations of 2110 may be performed by a control message receiver as described with reference to FIGS. 9 through 12.

At 2115, the UE may switch from a first BWP configuration for the first transceiver node to a second BWP configuration for the first transceiver node based on the control message. The operations of 2115 may be performed according to the methods described herein. In some examples, aspects of the operations of 2115 may be performed by an UE BWP configuration switching component as described with reference to FIGS. 9 through 12.

At 2120, the UE may start a set of separate timers for each of the set of transceiver nodes based on switching from the first BWP configuration for the first transceiver node to the second BWP configuration for the first transceiver node. The operations of 2120 may be performed according to the methods described herein. In some examples, aspects of the operations of 2120 may be performed by a timer starting component as described with reference to FIGS. 9 through 12.

Figure 22:
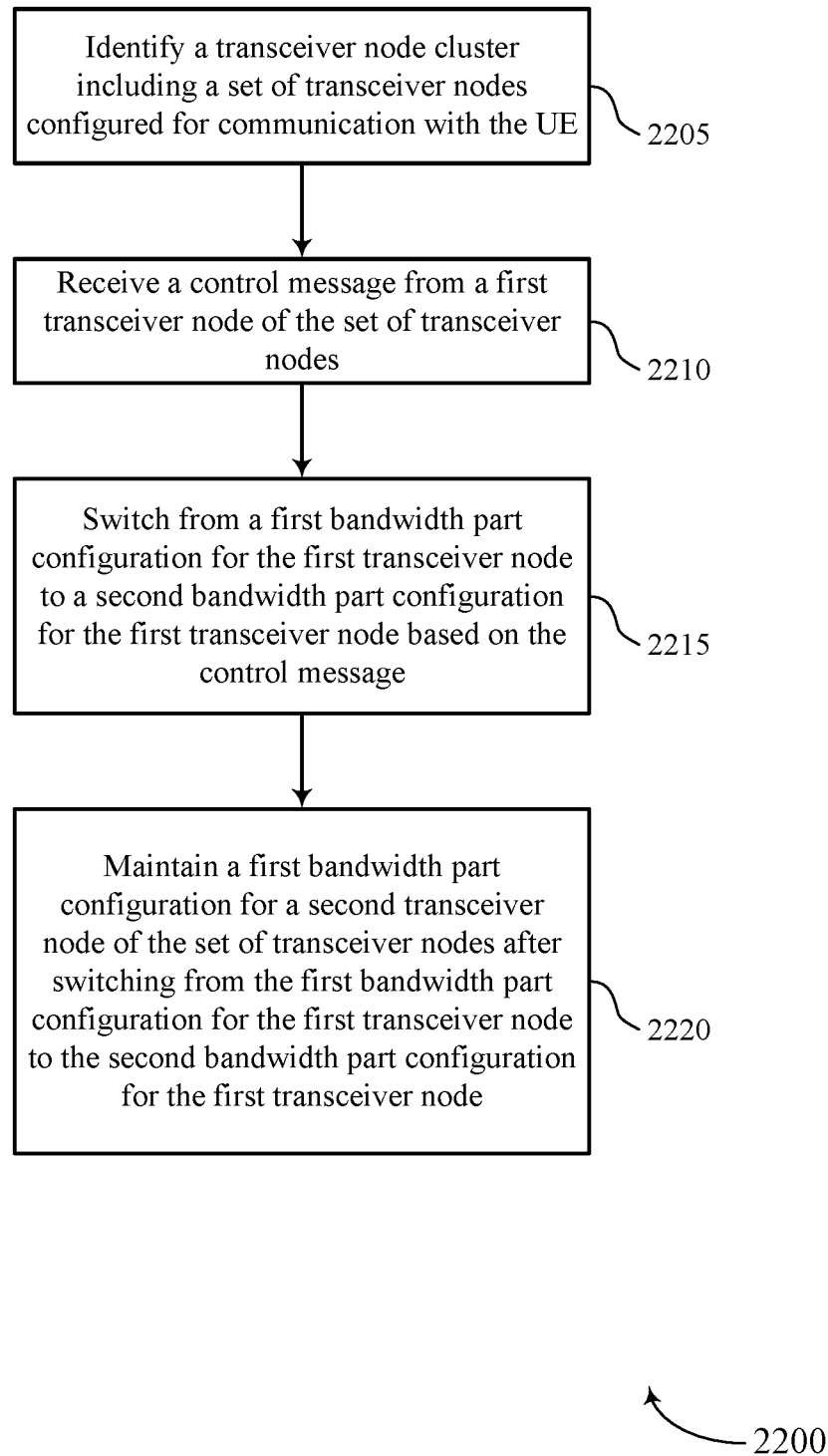

FIG. 22 shows a flowchart illustrating a method 2200 that supports BWP configuration switching for multiple transceiver nodes in accordance with aspects of the present disclosure. The operations of method 2200 may be implemented by a UE 115 or its components as described herein. For example, the operations of method 2200 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 2205, the UE may identify a transceiver node cluster including a set of transceiver nodes configured for communication with the UE. The operations of 2205 may be performed according to the methods described herein. In some examples, aspects of the operations of 2205 may be performed by an UE transceiver node cluster identifier as described with reference to FIGS. 9 through 12.

At 2210, the UE may receive a control message from a first transceiver node of the set of transceiver nodes. The operations of 2210 may be performed according to the methods described herein. In some examples, aspects of the operations of 2210 may be performed by a control message receiver as described with reference to FIGS. 9 through 12.

At 2215, the UE may switch from a first BWP configuration for the first transceiver node to a second BWP configuration for the first transceiver node based on the control message. The operations of 2215 may be performed according to the methods described herein. In some examples, aspects of the operations of 2215 may be performed by an UE BWP configuration switching component as described with reference to FIGS. 9 through 12.

At 2220, the UE may maintain a first BWP configuration for a second transceiver node of the set of transceiver nodes after switching from the first BWP configuration for the first transceiver node to the second BWP configuration for the first transceiver node. The operations of 2220 may be performed according to the methods described herein. In some examples, aspects of the operations of 2220 may be performed by an UE BWP configuration maintaining component as described with reference to FIGS. 9 through 12.

Figure 23:
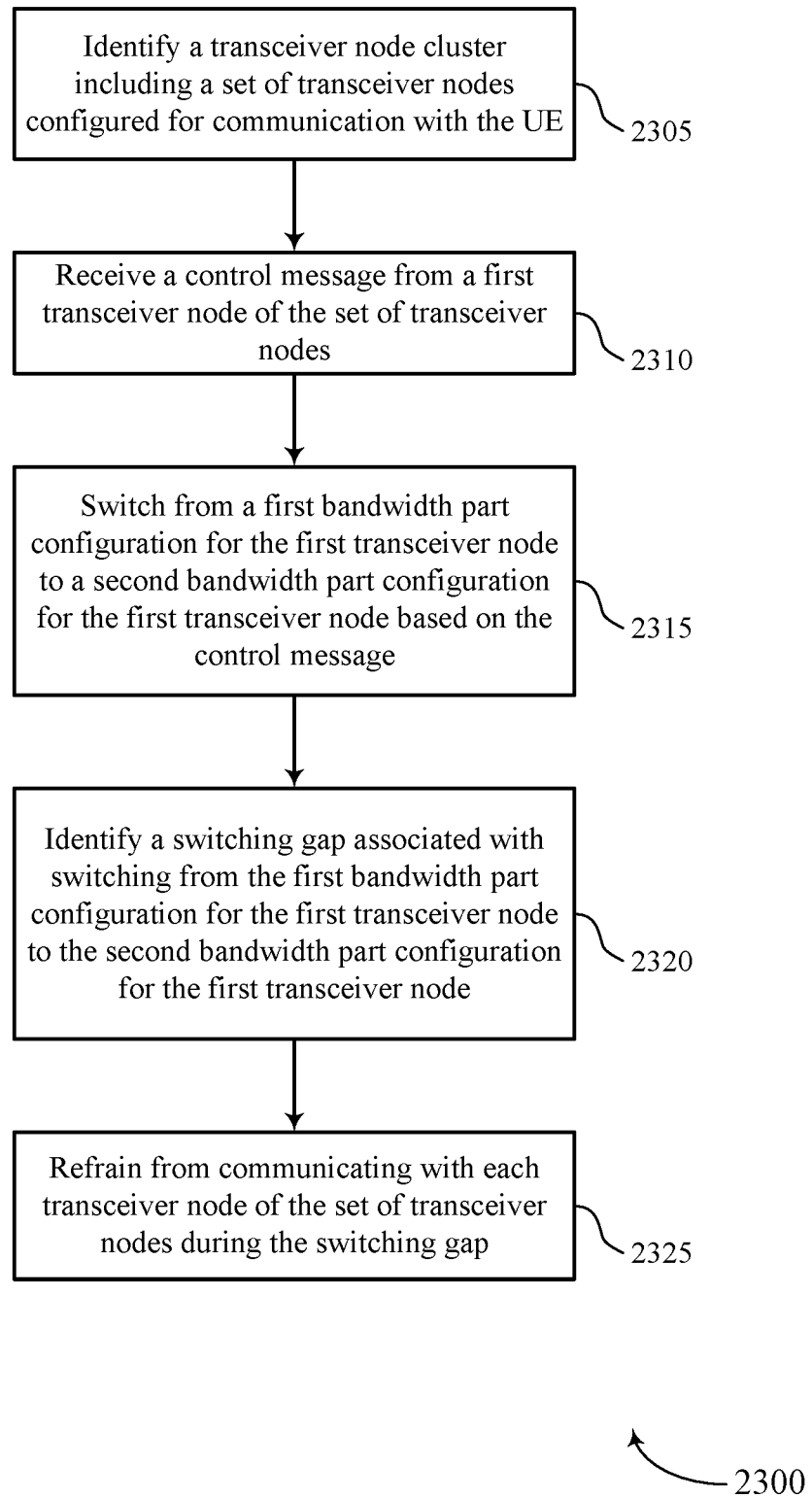

FIG. 23 shows a flowchart illustrating a method 2300 that supports BWP configuration switching for multiple transceiver nodes in accordance with aspects of the present disclosure. The operations of method 2300 may be implemented by a UE 115 or its components as described herein. For example, the operations of method 2300 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 2305, the UE may identify a transceiver node cluster including a set of transceiver nodes configured for communication with the UE. The operations of 2305 may be performed according to the methods described herein. In some examples, aspects of the operations of 2305 may be performed by an UE transceiver node cluster identifier as described with reference to FIGS. 9 through 12.

At 2310, the UE may receive a control message from a first transceiver node of the set of transceiver nodes. The operations of 2310 may be performed according to the methods described herein. In some examples, aspects of the operations of 2310 may be performed by a control message receiver as described with reference to FIGS. 9 through 12.

At 2315, the UE may switch from a first BWP configuration for the first transceiver node to a second BWP configuration for the first transceiver node based on the control message. The operations of 2315 may be performed according to the methods described herein. In some examples, aspects of the operations of 2315 may be performed by an UE BWP configuration switching component as described with reference to FIGS. 9 through 12.

At 2320, the UE may identify a switching gap associated with switching from the first BWP configuration for the first transceiver node to the second BWP configuration for the first transceiver node. The operations of 2320 may be performed according to the methods described herein. In some examples, aspects of the operations of 2320 may be performed by an UE switching gap component as described with reference to FIGS. 9 through 12.

At 2325, the UE may refrain from communicating with each transceiver node of the set of transceiver nodes during the switching gap. The operations of 2325 may be performed according to the methods described herein. In some examples, aspects of the operations of 2325 may be performed by an UE switching gap component as described with reference to FIGS. 9 through 12.

Figure 24:
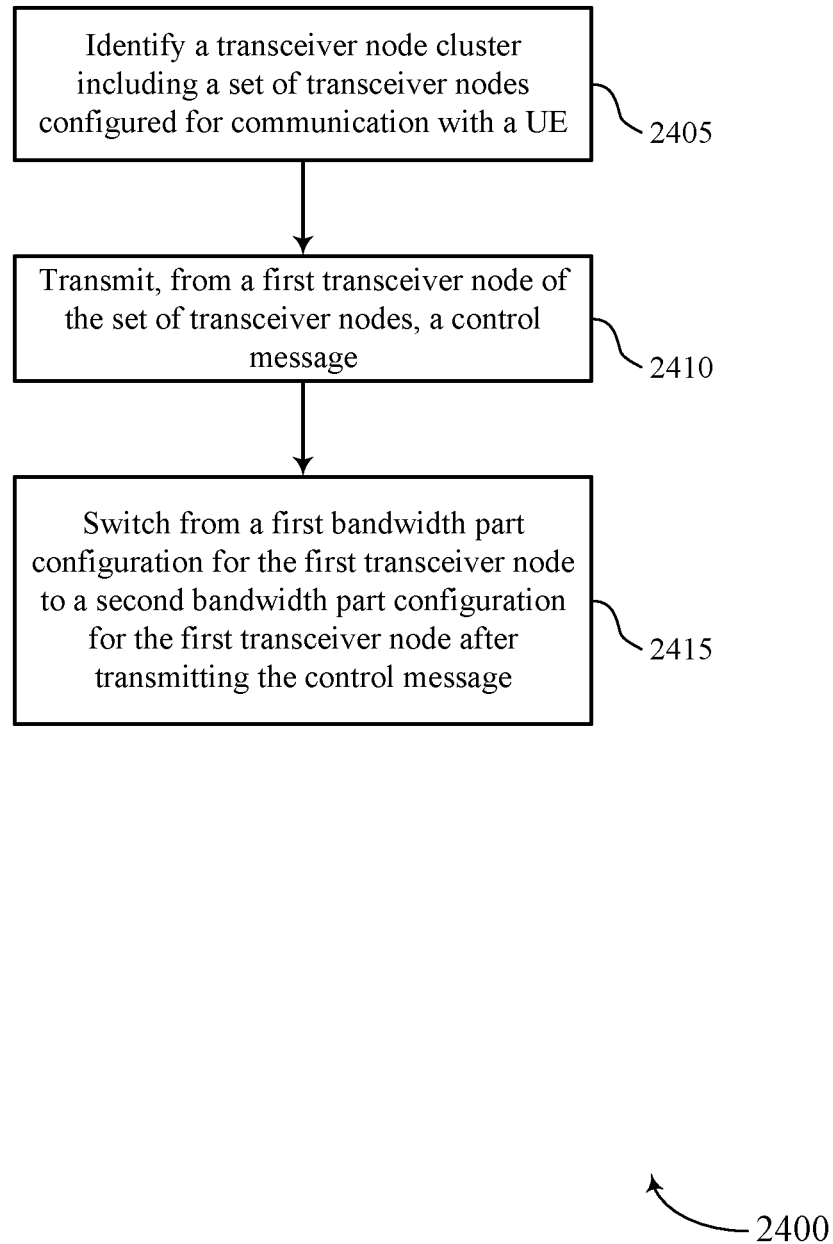

FIG. 24 shows a flowchart illustrating a method 2400 that supports BWP configuration switching for multiple transceiver nodes in accordance with aspects of the present disclosure. The operations of method 2400 may be implemented by a base station 105, a transceiver node cluster 205, or their components as described herein. For example, the operations of method 2400 may be performed by a communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2405, the base station may identify a transceiver node cluster including a set of transceiver nodes configured for communication with a UE. The operations of 2405 may be performed according to the methods described herein. In some examples, aspects of the operations of 2405 may be performed by a node cluster identifier as described with reference to FIGS. 13 through 16.

At 2410, the base station may transmit, from a first transceiver node of the set of transceiver nodes, a control message. The operations of 2410 may be performed according to the methods described herein. In some examples, aspects of the operations of 2410 may be performed by a control message transmitter as described with reference to FIGS. 13 through 16.

At 2415, the base station may switch from a first BWP configuration for the first transceiver node to a second BWP configuration for the first transceiver node after transmitting the control message. The operations of 2415 may be performed according to the methods described herein. In some examples, aspects of the operations of 2415 may be performed by a node BWP configuration switching component as described with reference to FIGS. 13 through 16.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving, as part of multi-transmission-reception-point (TRP) communications, a control message from a first transmission reception point of a plurality of transmission reception points via a first communication link from the first transmission reception point to the UE, the control message comprising a bandwidth part switching control message that triggers the UE to switch from a first bandwidth part configuration to a second bandwidth part configuration for a second transmission reception point of the plurality of transmission reception points, wherein the first communication link is established for communication between only the first transmission reception point and the UE;
   switching from the first bandwidth part configuration for the second transmission reception point of the plurality of transmission reception points to the second bandwidth part configuration for the second transmission reception point based at least in part on the bandwidth part switching control message; and
   communicating, via a second communication link from the second transmission reception point to the UE, with the second transmission reception point using the second bandwidth part configuration based at least in part on the switching, wherein the second communication link is established for communication between only the second transmission reception point and the UE.

2. The method of claim 1, wherein the bandwidth part switching control message triggers the UE to switch bandwidth part configurations for two or more transmission reception points of the plurality of transmission reception points, wherein the two or more transmission reception points comprise the first transmission reception point and the second transmission reception point, the method further comprising:
   switching from a first bandwidth part configuration for the first transmission reception point of the plurality of transmission reception points to a second bandwidth part configuration for the first transmission reception point based at least in part on the bandwidth part switching control message.

3. The method of claim 2, wherein the first bandwidth part configuration for the first transmission reception point spans a same radio frequency bandwidth as the first bandwidth part configuration for the second transmission reception point, and wherein the second bandwidth part configuration for the first transmission reception point spans a same radio frequency bandwidth as the second bandwidth part configuration for the second transmission reception point.

4. The method of claim 2, further comprising:
   receiving a configuration message that identifies at least the first transmission reception point as a master transmission reception point, wherein the switching from the first bandwidth part configuration for the second transmission reception point to the second bandwidth part configuration for the second transmission reception point is further based at least in part on the first transmission reception point being identified as the master transmission reception point.

5. The method of claim 1, further comprising:
starting a common timer for the plurality of transmission reception points based at least in part on switching from the first bandwidth part configuration for the second transmission reception point to the second bandwidth part configuration for the second transmission reception point;
receiving a communication from any of the plurality of transmission reception points; and
restarting the common timer for the plurality of transmission reception points based at least in part on receiving the communication from any of the plurality of transmission reception points.

6. The method of claim 5, further comprising:
switching from the second bandwidth part configuration for the second transmission reception point to a third bandwidth part configuration for the second transmission reception point upon expiration of the common timer for the plurality of transmission reception points; and
switching from a first bandwidth part configuration for the first transmission reception point of the plurality of transmission reception points to a second bandwidth part configuration for the first transmission reception point upon expiration of the common timer for the plurality of transmission reception points, wherein the third bandwidth part configuration for the second transmission reception point and the second bandwidth part configuration for the first transmission reception point comprise default bandwidth part configurations.

7. The method of claim 1, further comprising:
receiving a configuration message that identifies a subset of the plurality of transmission reception points as master transceiver nodes transmission reception points;
starting a common timer for the subset of the plurality of transmission reception points based at least in part on switching from the first bandwidth part configuration for the second transmission reception point to the second bandwidth part configuration for the second transmission reception point;
receiving a communication from a transmission reception point of the subset of the plurality of transmission reception points; and
restarting the common timer for the subset of the plurality of transmission reception points based at least in part on receiving the communication from the transmission reception point of the subset of the plurality of transmission reception points.

8. The method of claim 7, further comprising:
switching from the second bandwidth part configuration for the second transmission reception point to a third bandwidth part configuration for the second transmission reception point upon expiration of the common timer for the subset of the plurality of transmission reception points; and
switching from a first bandwidth part configuration for the transmission reception point of the subset of the plurality of transmission reception points to a second bandwidth part configuration for the transmission reception point of the subset of the plurality of transmission reception points upon expiration of the common timer for the subset of the plurality of transmission reception points, wherein the third bandwidth part configuration for the second transmission reception point and the second bandwidth part configuration for the transmission reception point of the subset of the plurality of transmission reception points comprise default bandwidth part configurations.

9. The method of claim 7, further comprising:
receiving a second communication from a third transmission reception point of the plurality of transmission reception points that is outside the subset of the plurality of transmission reception points; and
maintaining the common timer for the subset of the plurality of transmission reception points after receiving the second communication from the third transmission reception point that is outside the subset of the plurality of transmission reception points.

10. The method of claim 1, further comprising:
starting a plurality of separate timers for each of the plurality of transmission reception points based at least in part on switching from the first bandwidth part configuration for the second transmission reception point to the second bandwidth part configuration for the second transmission reception point;
receiving a communication from the second transmission reception point; and
restarting a separate timer at the second transmission reception point based at least in part on receiving the communication from the second transmission reception point.

11. The method of claim 10, further comprising:
switching from the second bandwidth part configuration for the second transmission reception point to a third bandwidth part configuration for the second transmission reception point upon expiration of a first expiring timer of the plurality of separate timers; and
switching from a first bandwidth part configuration for the first transmission reception point of the plurality of transmission reception points to a second bandwidth part configuration for the first transmission reception point upon expiration of the first expiring timer of the plurality of separate timers, wherein the third bandwidth part configuration for the second transmission reception point and the second bandwidth part configuration for the first transmission reception point comprise default bandwidth part configurations.

12. The method of claim 1, further comprising:
maintaining a first bandwidth part configuration for the first transmission reception point of the plurality of transmission reception points after switching from the first bandwidth part configuration for the second transmission reception point to the second bandwidth part configuration for the second transmission reception point.

13. The method of claim 12, further comprising:
starting a first timer for the second transmission reception point based at least in part on switching from the first bandwidth part configuration for the second transmission reception point to the second bandwidth part configuration for the second transmission reception point.

14. The method of claim 13, further comprising:
receiving a second control message from the first transmission reception point;
switching from the first bandwidth part configuration for the first transmission reception point to a second bandwidth part configuration for the first transmission reception point;
starting a second timer for the first transmission reception point based at least in part on switching from the first bandwidth part configuration for the first transmission reception point to the second bandwidth part configuration for the first transmission reception point; and maintaining the first timer after switching from the first bandwidth part configuration for the first transmission reception point to the second bandwidth part configuration for the first transmission reception point.

15. A method for wireless communications, comprising:

transmitting, from a first transmission reception point of a plurality of transmission reception points to a user equipment (UE) via a first communication link from the first transmission reception point to the UE, a control message, the control message comprising a bandwidth part switching control message that triggers the UE to switch from a first bandwidth part configuration to a second bandwidth part configuration for a second transmission reception point of the plurality of transmission reception points;

switching from the first bandwidth part configuration for the second transmission reception point to the second bandwidth part configuration for the second transmission reception point after transmitting the bandwidth part switching control message; and communicating, via a second communication link from the second transmission reception point to the UE and using the second bandwidth part configuration, with the UE based at least in part on the switching.

16. The method of claim 15, wherein switching from the first bandwidth part configuration for the second transmission reception point to the second bandwidth part configuration for the second transmission reception point comprises:

switching from a first plurality of bandwidth part configurations for each transmission reception point of the plurality of transmission reception points to a second plurality of bandwidth part configurations for each transmission reception point of the plurality of transmission reception points after transmitting the control message.

17. The method of claim 16, wherein each of the first plurality of bandwidth part configurations for each transmission reception point of the plurality of transmission reception points spans a same radio frequency bandwidth and wherein each of the second plurality of bandwidth part configurations for each transmission reception point of the plurality of transmission reception points spans a same frequency radio frequency bandwidth.

18. The method of claim 16, further comprising:

transmitting a configuration message that identifies at least the first transmission reception point as a master transmission reception point, wherein switching from the first plurality of bandwidth part configurations for each transmission reception point of the plurality of transmission reception points to the second plurality of bandwidth part configurations for each transmission reception point of the plurality of transmission reception points is based at least in part on the first transmission reception point being the master transmission reception point.

19. The method of claim 15, further comprising:

determining an expiration time of a common timer for the plurality of transmission reception points based at least in part on switching from the first bandwidth part configuration for the second transmission reception point to the second bandwidth part configuration for the second transmission reception point;

transmitting a communication from any of the plurality of transmission reception points; and updating the expiration time based at least in part on transmitting the communication from any of the plurality of transmission reception points.

20. The method of claim 19, further comprising:

switching from the second bandwidth part configuration for the second transmission reception point to a third bandwidth part configuration for the second transmission reception point upon reaching the determined expiration time; and switching from a first bandwidth part configuration for the first transmission reception point of the plurality of transmission reception points to a second bandwidth part configuration for the first transmission reception point upon reaching the determined expiration time, wherein the third bandwidth part configuration for the second transmission reception point and the second bandwidth part configuration for the first transmission reception point comprise default bandwidth part configurations.

21. The method of claim 15, further comprising:

transmitting a configuration message that identifies a subset of the plurality of transmission reception points as master transmission reception points;

determining an expiration time for a common timer for the subset of the plurality of transmission reception points based at least in part on switching from the first bandwidth part configuration for the second transmission reception point to the second bandwidth part configuration for the second transmission reception point;

transmitting a communication from a transmission reception point of the subset of the plurality of transmission reception points; and updating the expiration time based at least in part on transmitting the communication from the transmission reception point of the subset of the plurality of transmission reception points.

22. The method of claim 21, further comprising:

switching from the second bandwidth part configuration for the second transmission reception point to a third bandwidth part configuration for the second transmission reception point upon reaching the determined expiration time; and switching from a first bandwidth part configuration for the transmission reception point of the subset of the plurality of transmission reception points to a second bandwidth part configuration for the transmission reception point of the subset of the plurality of transmission reception points upon reaching the determined expiration time, wherein the third bandwidth part configuration for the second transmission reception point and the second bandwidth part configuration for the transmission reception point of the subset of the plurality of transmission reception points comprise default bandwidth part configurations.

23. The method of claim 21, further comprising:

transmitting a second communication from a third transmission reception point of the plurality of transmission reception points that is outside the subset of the plurality of transmission reception points; and refraining from updating the expiration time based at least in part on transmitting the second communication from the third transmission reception point of the plurality of transmission reception points that is outside the subset of the plurality of transmission reception points.

24. The method of claim 15, further comprising:
determining a plurality of expiration times for each of the plurality of transmission reception points based at least in part on switching from the first bandwidth part configuration for the second transmission reception point to the second bandwidth part configuration for the second transmission reception point;
transmitting a communication from a transmission reception point of the plurality of transmission reception points; and
updating an expiration time for the transmission reception point of the plurality of transmission reception points based at least in part on transmitting the communication.

25. The method of claim 24, further comprising:
switching from the second bandwidth part configuration for the second transmission reception point to a third bandwidth part configuration for the second transmission reception point upon reaching a first expiration time of the plurality of expiration times; and
switching from a first bandwidth part configuration for the first transmission reception point of the plurality of transmission reception points to a second bandwidth part configuration for the first transmission reception point upon reaching the determined expiration time, wherein the third bandwidth part configuration for the second transmission reception point and the second bandwidth part configuration for the first transmission reception point comprise default bandwidth part configurations.

26. The method of claim 15, further comprising:
maintaining a first bandwidth part configuration for the first transmission reception point of the plurality of transmission reception points after switching from the first bandwidth part configuration for the second transmission reception point to the second bandwidth part configuration for the second transmission reception point.

27. The method of claim 26, further comprising:
determining a first expiration time at the second transmission reception point based at least in part on switching from the first bandwidth part configuration for the second transmission reception point to the second bandwidth part configuration for the second transmission reception point.

28. The method of claim 27, further comprising:
transmitting a second control message from the first transmission reception point;
switching from the first bandwidth part configuration for the first transmission reception point to a second bandwidth part configuration for the first transmission reception point;
determining a second expiration time at the first transmission reception point based at least in part on switching from the first bandwidth part configuration for the first transmission reception point to the second bandwidth part configuration for the first transmission reception point; and
refraining from updating the first expiration time after switching from the first bandwidth part configuration for the first transmission reception point to the second bandwidth part configuration for the first transmission reception point.

29. An apparatus for wireless communications at a user equipment (UE), comprising:
a processor,
memory coupled with the processor; and
instructions stored in the memory and executable by the processor to cause the apparatus to:
receive a control message from a first transmission reception point of a plurality of transmission reception points via a first communication link from the first transmission reception point to the UE, the control message comprising a bandwidth part switching control message that triggers the UE to switch from a first bandwidth part configuration to a second bandwidth part configuration for a second transmission reception point of the plurality of transmission reception points;
switch from the first bandwidth part configuration for the second transmission reception point of the plurality of transmission reception points to the second bandwidth part configuration for the second transmission reception point based at least in part on the bandwidth part switching control message; and
communicate, via a second communication link from the second transmission reception point to the UE, with the second transmission reception point using the second bandwidth part configuration based at least in part on the switching.

30. An apparatus for wireless communications, comprising:
a processor,
memory coupled with the processor; and
instructions stored in the memory and executable by the processor to cause the apparatus to:
transmit, from a first transmission reception point of a plurality of transmission reception points to a user equipment (UE) via a first communication link from the first transmission reception point to the UE, a control message, the control message comprising a bandwidth part switching control message that triggers the UE to switch from a first bandwidth part configuration to a second bandwidth part configuration for a second transmission reception point of the plurality of transmission reception points;
switch from the first bandwidth part configuration for the second transmission reception point of the plurality of transmission reception points to the second bandwidth part configuration for the second transmission reception point after transmitting the bandwidth part switching control message; and
communicate, via a second communication link from the second transmission reception point to the UE and using the second bandwidth part configuration, with the UE based at least in part on the switching.

* * * * *